US007959086B2

(12) United States Patent
Mattlin et al.

(10) Patent No.: US 7,959,086 B2
(45) Date of Patent: Jun. 14, 2011

(54) SYSTEM AND METHOD FOR RFID-BASED PRINTED MEDIA READING ACTIVITY DATA ACQUISITION AND ANALYSIS

(75) Inventors: Jay Mattlin, Millburn, NJ (US); Richard Fletcher, Cambridge, MA (US)

(73) Assignee: GFK Mediamark Research & Intelligence, LLC, New York, NY (US)

( * ) Notice: Subject to any disclaimer, the term of this patent is extended or adjusted under 35 U.S.C. 154(b) by 397 days.

(21) Appl. No.: 11/875,664

(22) Filed: Oct. 19, 2007

(65) Prior Publication Data
US 2008/0177591 A1 Jul. 24, 2008

Related U.S. Application Data

(63) Continuation-in-part of application No. 11/419,411, filed on May 19, 2006.

(60) Provisional application No. 60/750,612, filed on Dec. 15, 2005.

(51) Int. Cl.
*G06K 19/06* (2006.01)
(52) U.S. Cl. .......................... 235/492; 235/487
(58) Field of Classification Search .................. 235/492, 235/451, 385
See application file for complete search history.

(56) References Cited

U.S. PATENT DOCUMENTS

| | | | | | |
|---|---|---|---|---|---|
| 2,808,274 | A | * | 10/1957 | Goldman | 281/20 |
| 4,128,262 | A | * | 12/1978 | Du Corday | 281/34 |
| 4,659,314 | A | * | 4/1987 | Weinblatt | 434/236 |
| 4,661,847 | A | | 4/1987 | Weinblatt | |
| 4,726,771 | A | * | 2/1988 | Weinblatt | 434/236 |
| 4,781,596 | A | | 11/1988 | Weinblatt | |
| 4,939,326 | A | * | 7/1990 | Weinblatt | 200/506 |
| 4,992,867 | A | | 2/1991 | Weinblatt | |
| 5,019,679 | A | * | 5/1991 | Weinblatt | 200/508 |
| 5,214,409 | A | | 5/1993 | Beigel | |
| 5,234,345 | A | | 8/1993 | Weinblatt | |
| 5,483,276 | A | | 1/1996 | Brooks et al. | |

(Continued)

FOREIGN PATENT DOCUMENTS

EP 0408348 1/1991

(Continued)

OTHER PUBLICATIONS

Baer et al., "Objective Means of Determining Magazine Readership," Final Report, SRI International, Jul. 1982.

(Continued)

*Primary Examiner* — Daniel A Hess
*Assistant Examiner* — Paultep Savusdiphol
(74) *Attorney, Agent, or Firm* — Chadbourne & Parke LLP; Walter G. Hanchuk

(57) ABSTRACT

The subject invention provides a means of automatically detecting and recording a person's use of magazines, i.e. printed media exposure, for the purpose of market research. The present invention comprises one or more electrically conductive marker regions applied to certain specific locations on one or more magazine pages. In one general embodiment, the presence and relative separation of the marker regions are detected by a capacitive sensors and electronic device that stores, processes and communicates the data wirelessly to an external device. In another embodiment, a passive chip less tag is used to indirectly measure the change in conductivity of the conductive regions caused by prolonged exposure to air or light. Exemplary methods are described for acquiring readership and exposure data using the present invention.

23 Claims, 16 Drawing Sheets

U.S. PATENT DOCUMENTS

| | | | |
|---|---|---|---|
| 5,689,238 A | 11/1997 | Cannon, Jr. et al. | |
| 5,963,134 A * | 10/1999 | Bowers et al. | 340/572.1 |
| 6,037,879 A | 3/2000 | Tuttle | |
| 6,232,870 B1 | 5/2001 | Garber et al. | |
| 6,600,419 B2 | 7/2003 | Barritz | |
| 6,834,251 B1 | 12/2004 | Fletcher | |
| 6,860,422 B2 * | 3/2005 | Hull et al. | 235/376 |
| 6,958,710 B2 | 10/2005 | Zhang et al. | |
| 7,000,834 B2 * | 2/2006 | Hind et al. | 235/385 |
| 7,129,840 B2 * | 10/2006 | Hull et al. | 340/568.1 |
| 7,175,082 B2 * | 2/2007 | Hoshina | 235/385 |
| 7,316,347 B2 * | 1/2008 | Poor | 235/375 |
| 7,341,196 B2 * | 3/2008 | Sandrini et al. | 235/487 |
| 2002/0008623 A1 | 1/2002 | Garber et al. | |
| 2002/0107727 A1 | 8/2002 | Traub | |
| 2002/0113707 A1 | 8/2002 | Grunes et al. | |
| 2002/0139848 A1 * | 10/2002 | Catan | 235/385 |
| 2002/0180588 A1 | 12/2002 | Erickson et al. | |
| 2003/0005430 A1 | 1/2003 | Kolessar et al. | |
| 2003/0041303 A1 | 2/2003 | Milton | |
| 2003/0117281 A1 * | 6/2003 | Sriharto et al. | 340/568.1 |
| 2003/0122708 A1 | 7/2003 | Percy et al. | |
| 2003/0163287 A1 | 8/2003 | Vock et al. | |
| 2003/0171833 A1 | 9/2003 | Crystal et al. | |
| 2004/0015399 A1 | 1/2004 | Maggio | |
| 2004/0054627 A1 | 3/2004 | Rutledge | |
| 2004/0061994 A1 * | 4/2004 | Kerr et al. | 361/679 |
| 2004/0080452 A1 | 4/2004 | Percy et al. | |
| 2005/0035857 A1 | 2/2005 | Zhang et al. | |
| 2005/0040230 A1 | 2/2005 | Swartz et al. | |
| 2005/0093698 A1 * | 5/2005 | Sakamoto et al. | 340/572.1 |
| 2005/0116047 A1 * | 6/2005 | Lu et al. | 235/487 |
| 2005/0201826 A1 | 9/2005 | Zhang et al. | |
| 2005/0272015 A1 * | 12/2005 | Jensen et al. | 434/236 |
| 2005/0272016 A1 * | 12/2005 | Jensen et al. | 434/236 |
| 2005/0272017 A1 * | 12/2005 | Neuhauser et al. | 434/236 |
| 2005/0272018 A1 * | 12/2005 | Crystal et al. | 434/236 |
| 2005/0272019 A1 * | 12/2005 | Crystal et al. | 434/236 |
| 2006/0029296 A1 | 2/2006 | King et al. | |
| 2006/0043177 A1 * | 3/2006 | Nycz et al. | 235/385 |
| 2006/0071774 A1 | 4/2006 | Brown et al. | |

FOREIGN PATENT DOCUMENTS

| | | |
|---|---|---|
| EP | 0525947 | 2/1993 |

OTHER PUBLICATIONS

Schreiber et al., "Electro-mechanical Devices for Recording Readership: Report of a Development Project," 1983.

Douglas et al., "The Magazine Meter—1995: A Report of the Watch Meter System," Readership Research: Theory and Practice, Proc. of the Fourth Intl. Symp., 1988.

PCT International Search Report, PCT/US07/61494, dated Nov. 6, 2007.

* cited by examiner

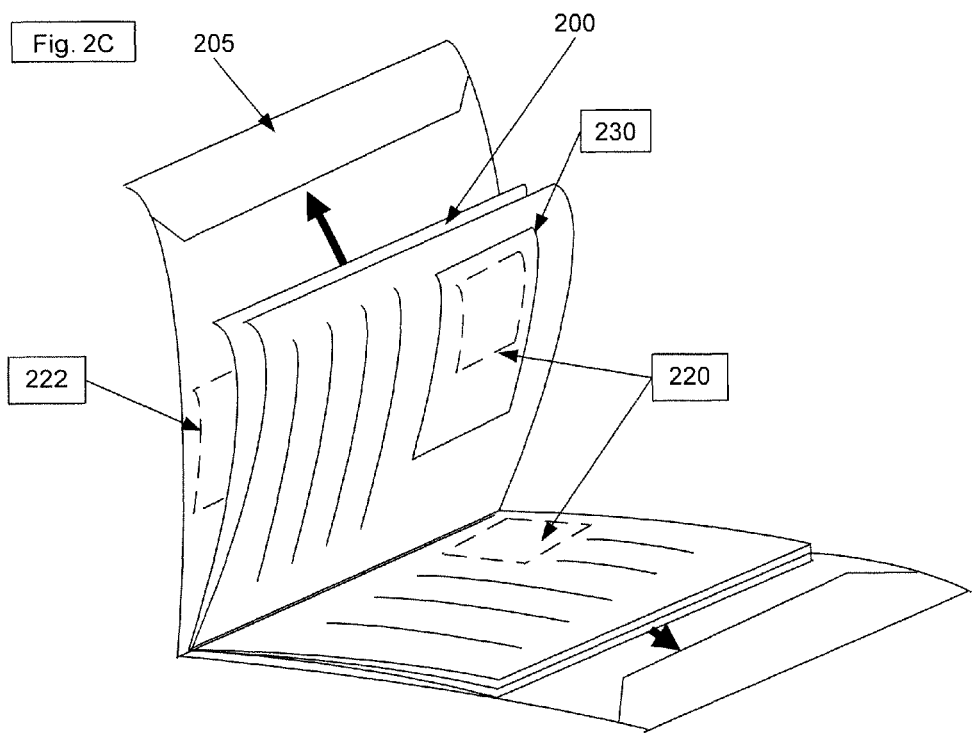
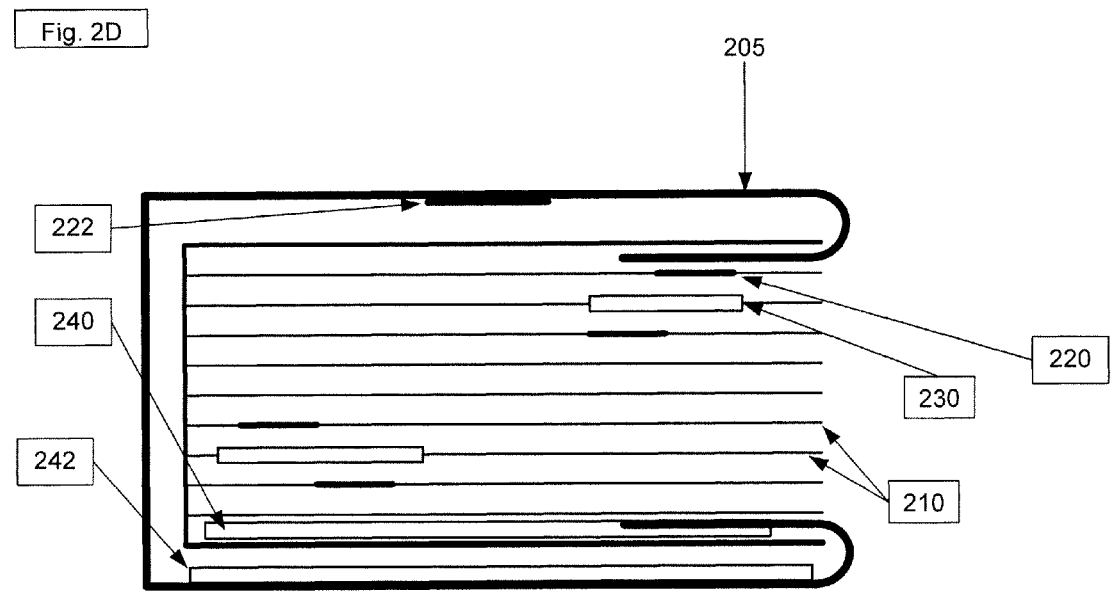

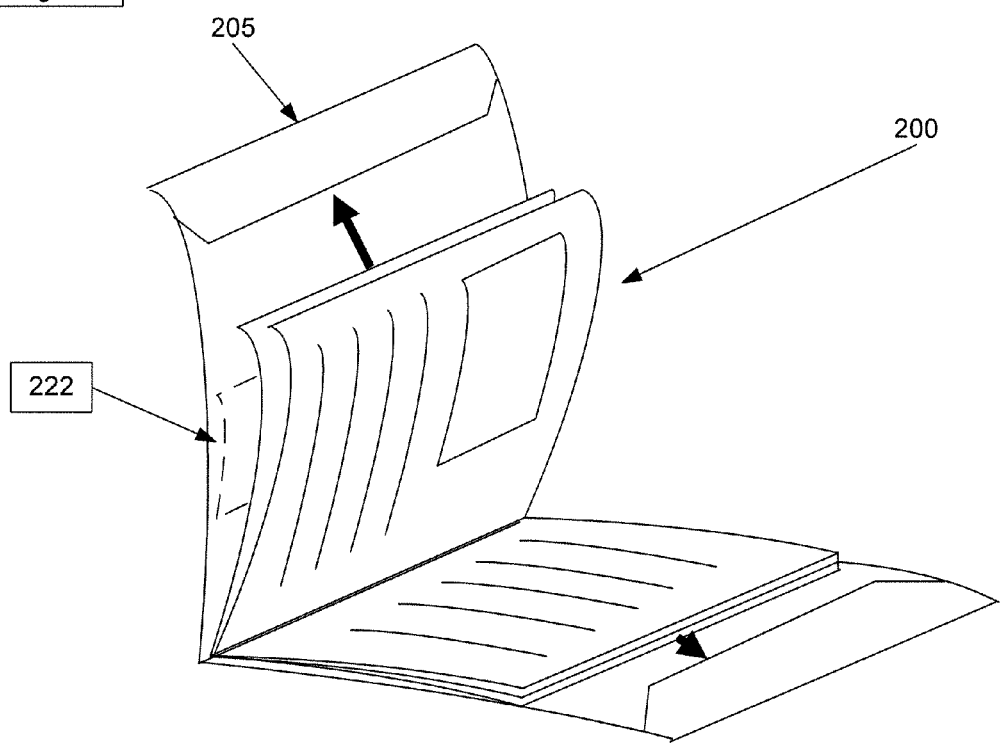
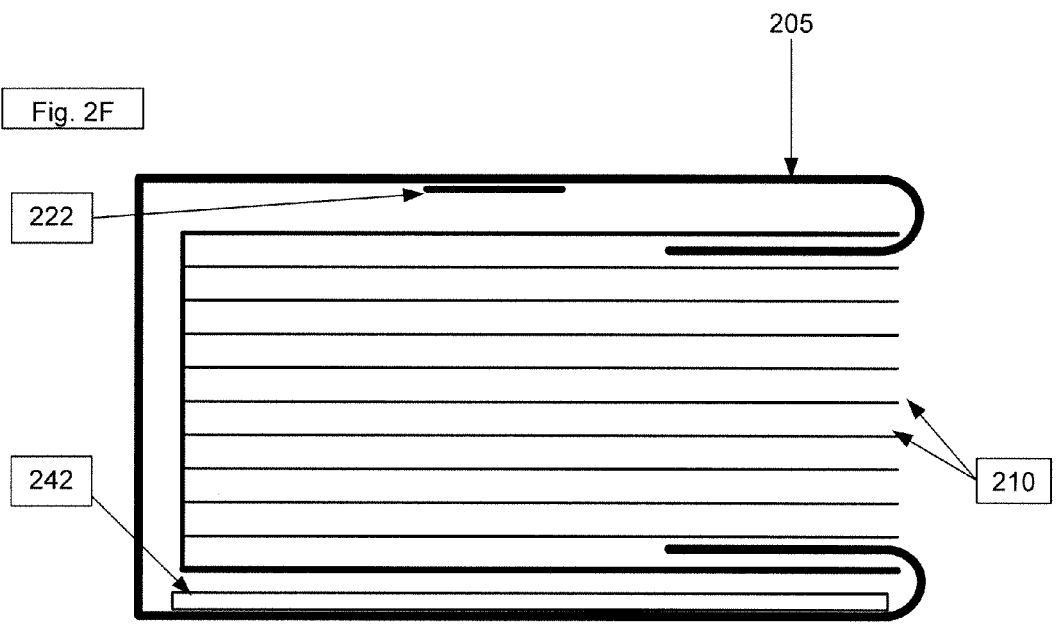

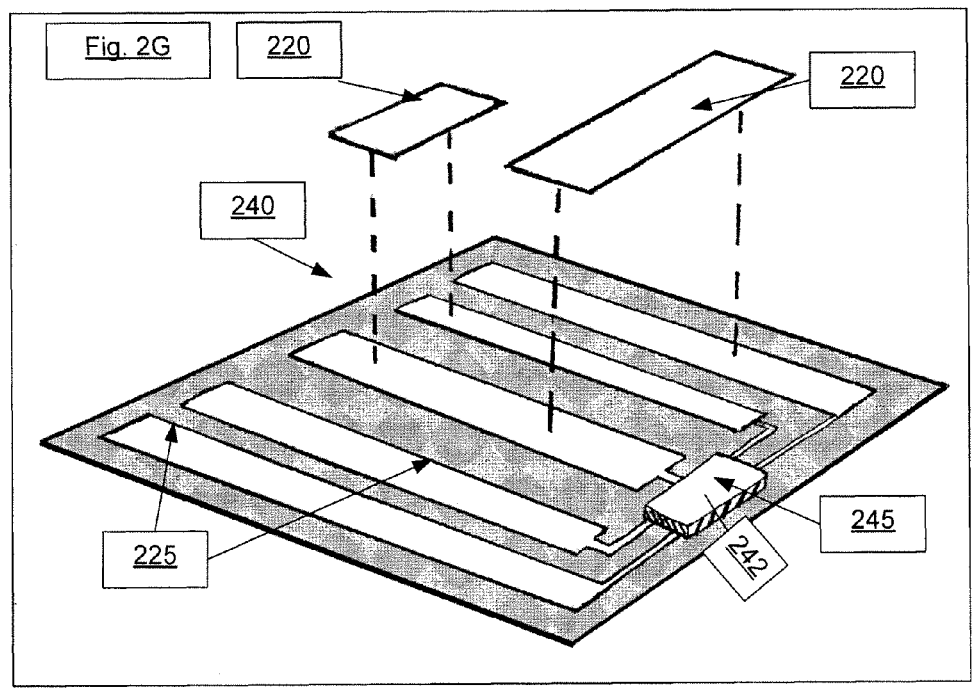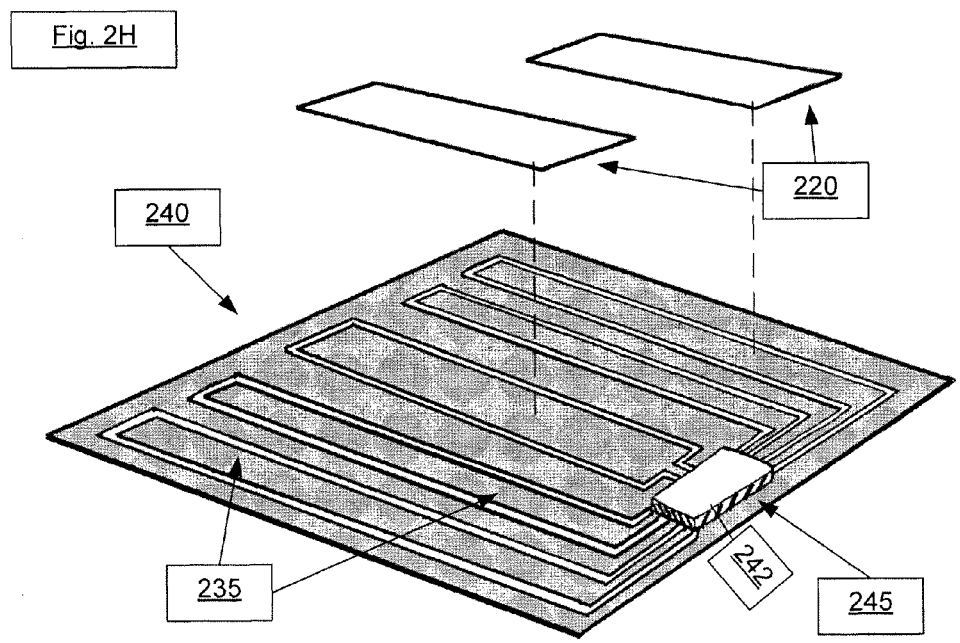

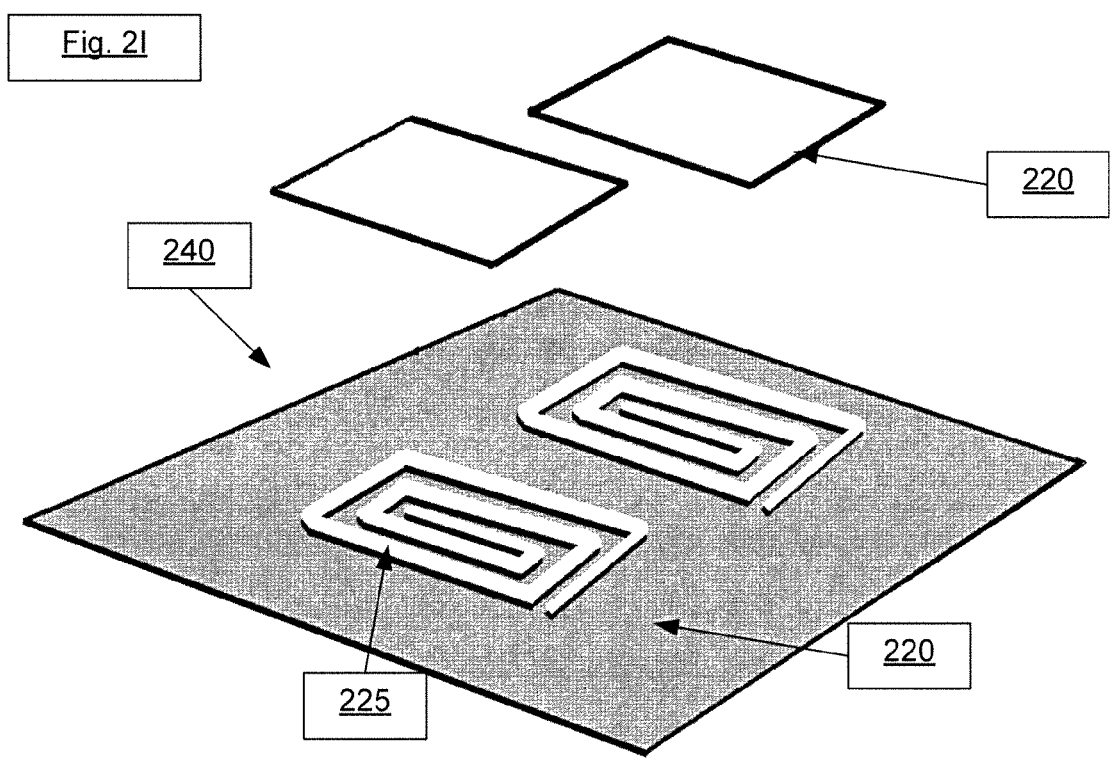

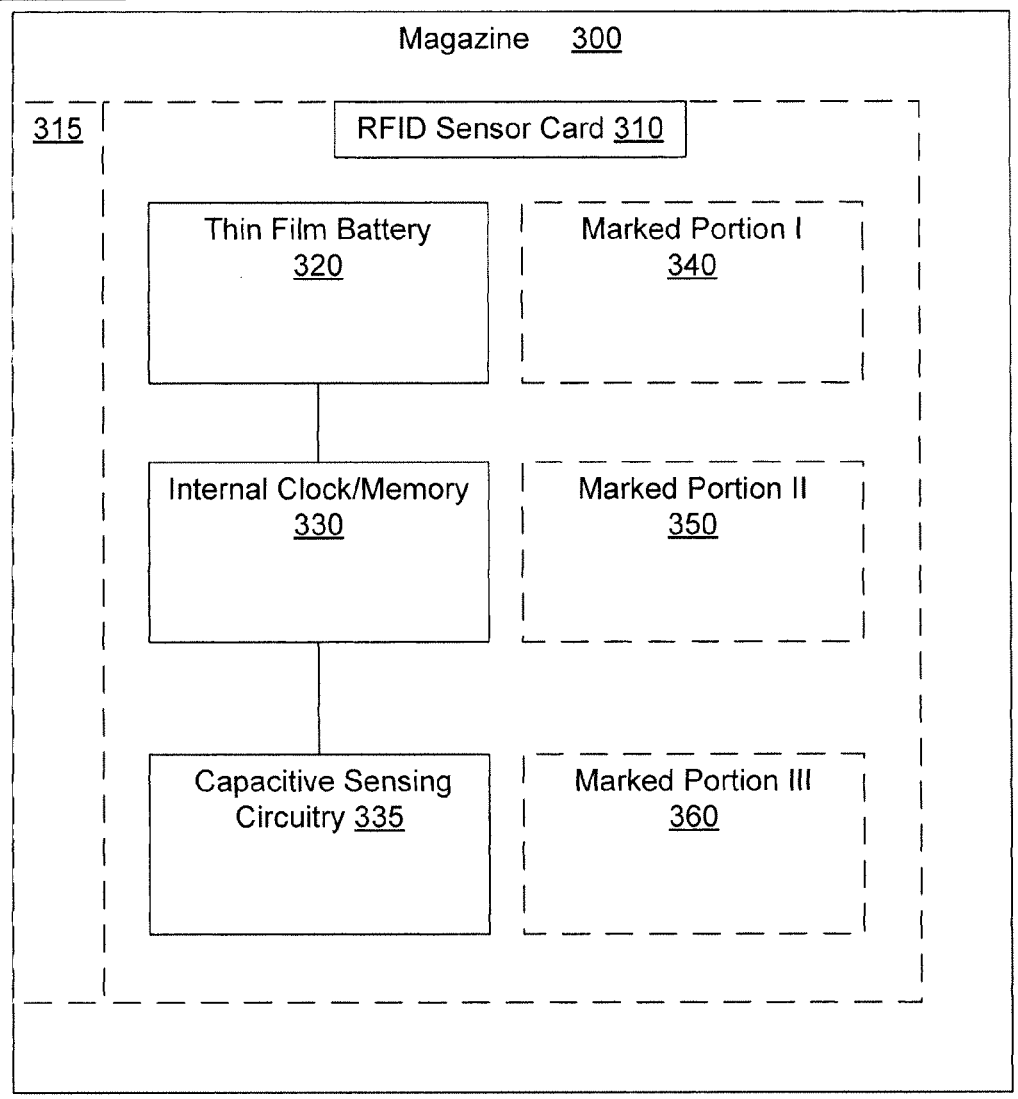

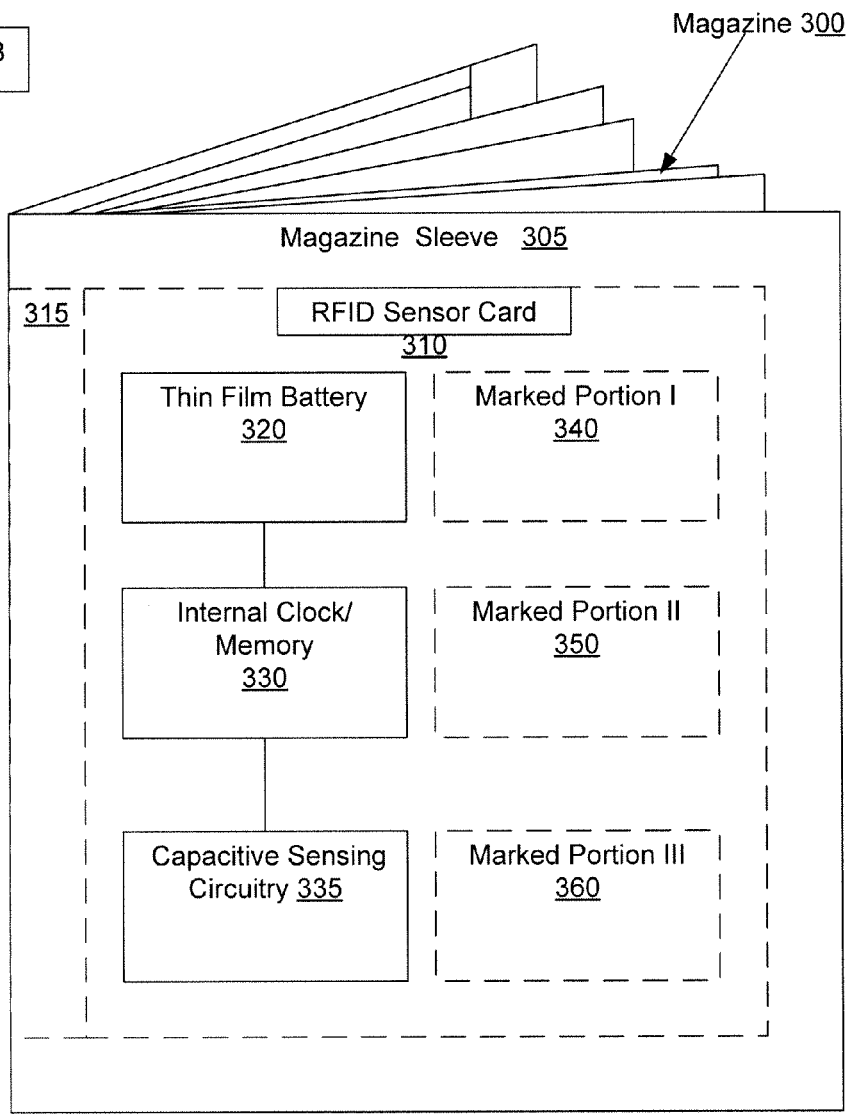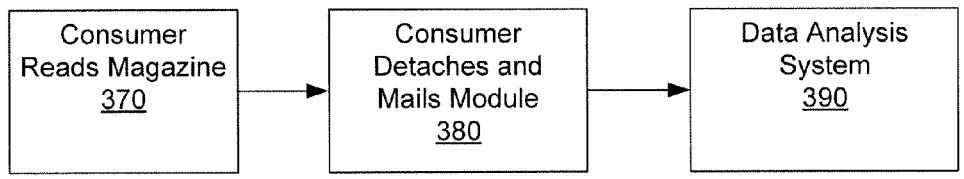

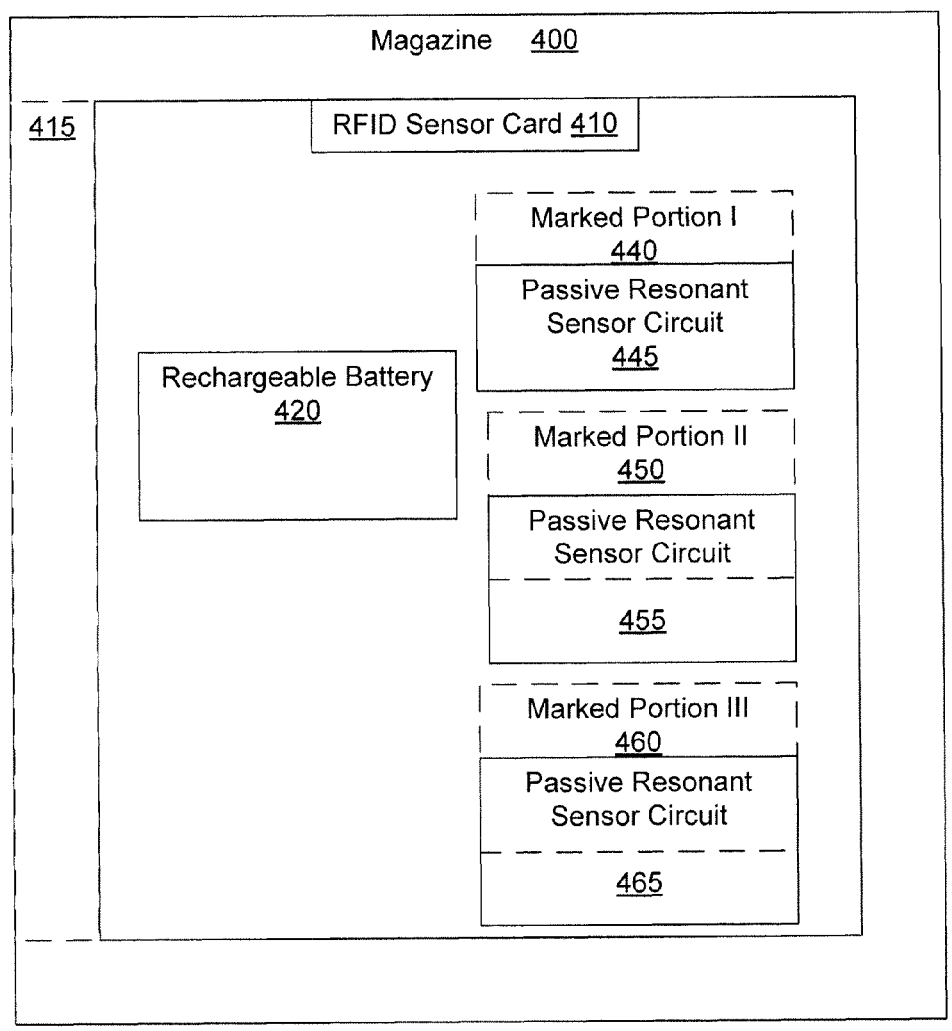

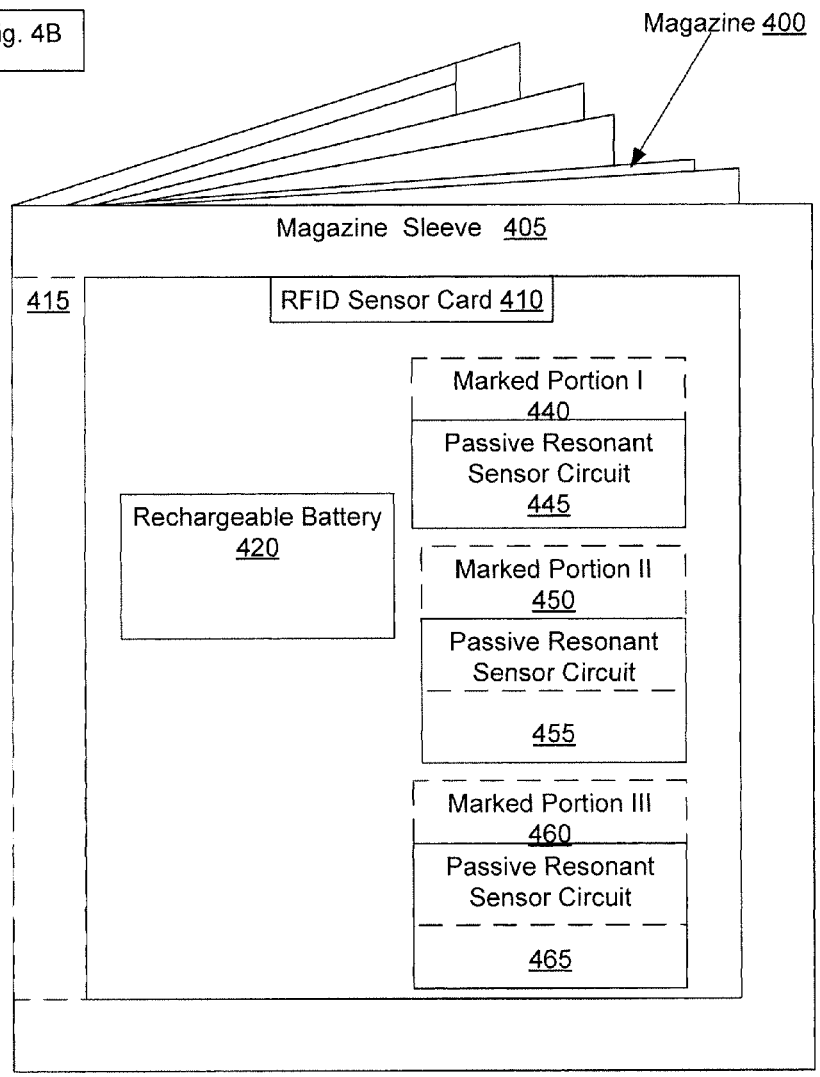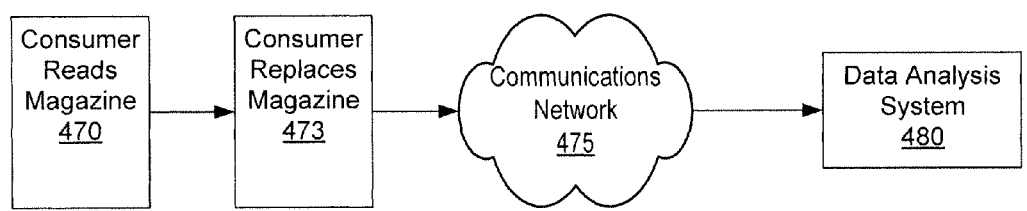

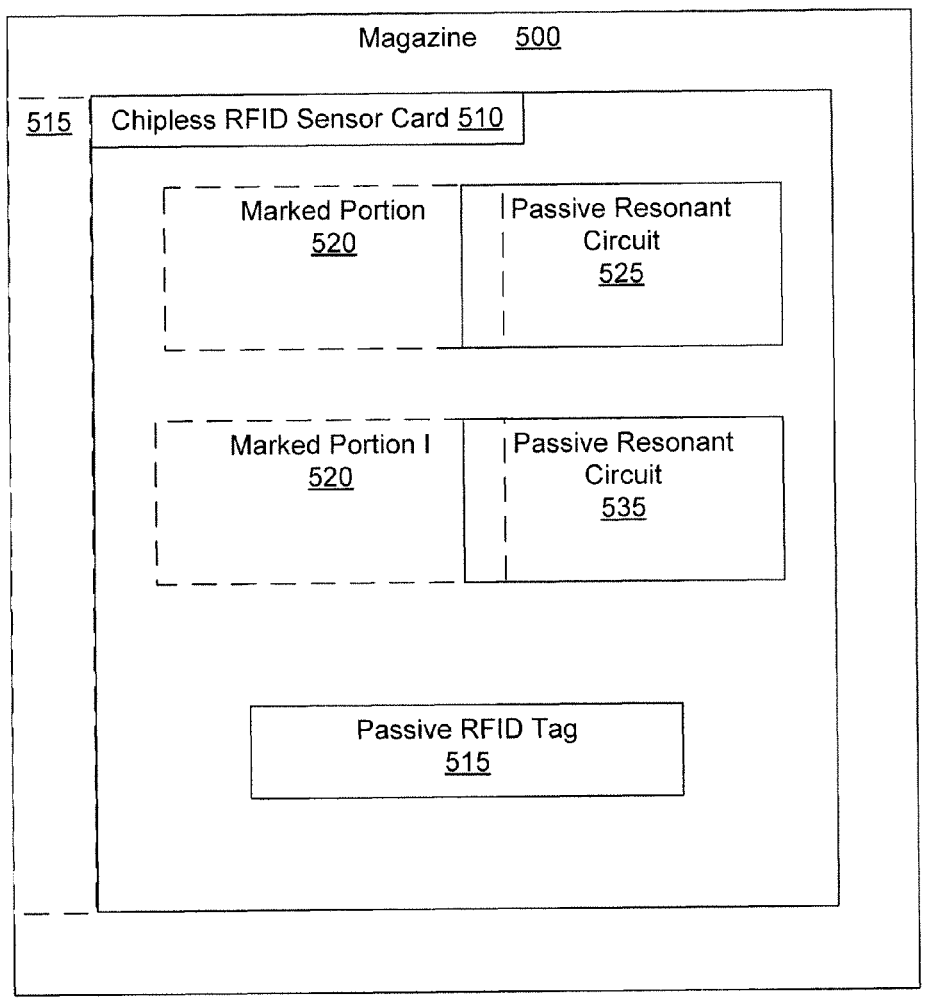

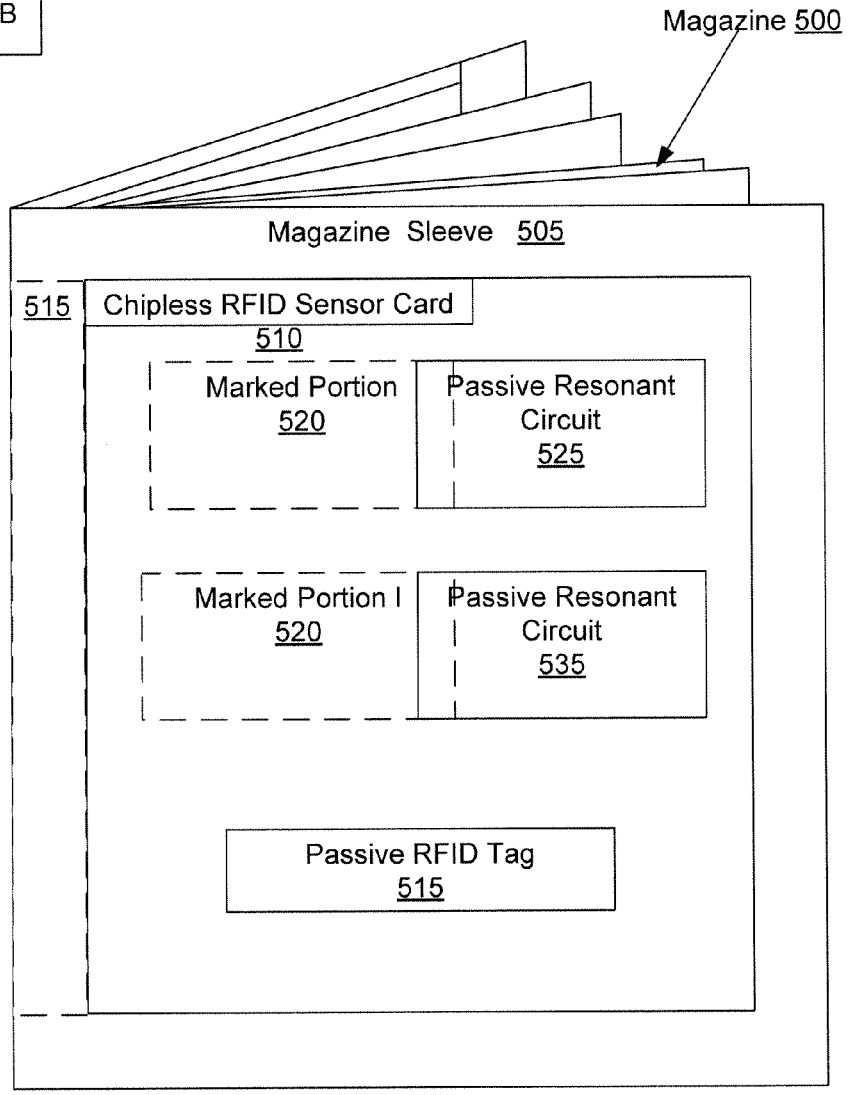
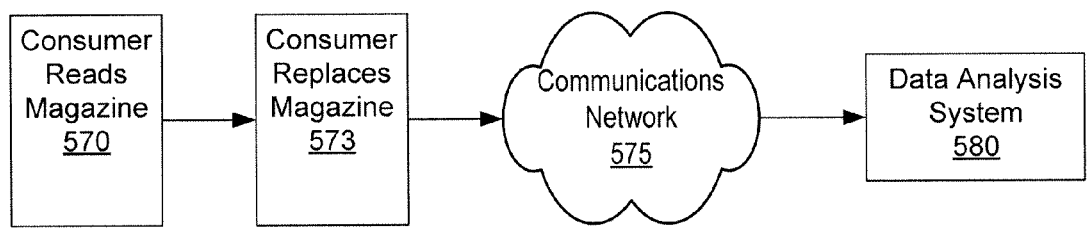

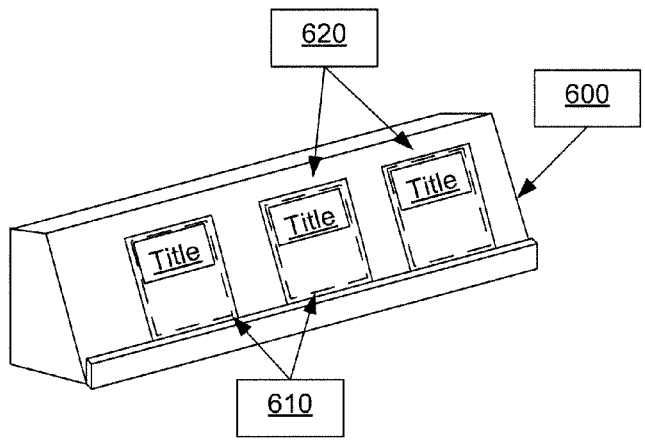
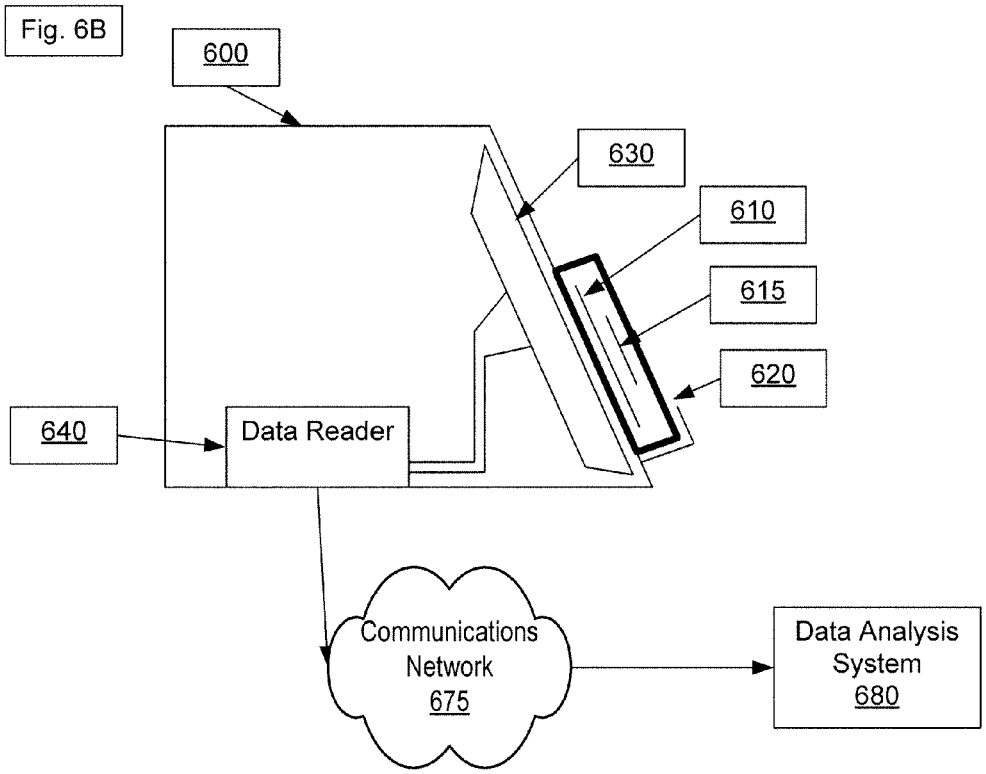

SYSTEM AND METHOD FOR RFID-BASED PRINTED MEDIA READING ACTIVITY DATA ACQUISITION AND ANALYSIS

This application is a Continuation-in-Part and claims priority under 35 USC §§119, 120 to the U.S. non-provisional application Ser. No. 11/419,411, titled "SYSTEM AND METHOD FOR RFID-BASED PRINTED MEDIA READING ACTIVITY DATA ACQUISITION AND ANALYSIS," and filed on May 19, 2006 and U.S. provisional application Ser. No. 60/750,612, titled, "System and Method for RFID-Based Printed Media Reading Activity Data Acquisition and Analysis", filed Dec. 15, 2005, both of which are hereby incorporated by reference.

FIELD OF THE INVENTION

The present invention relates, generally, to acquisition of media exposure information. More specifically, embodiments of the invention are directed to systems, methods and apparatuses for acquiring data related to exposure characteristics of user/printed media interactions.

BACKGROUND OF THE INVENTION

There has been a significant need to measure exposure information associated with various types of media to enable advertisers to optimize their advertising efforts. For example, in publishing and magazine advertising, there is an ongoing need to estimate consumers' readership of printed media such as magazines as well as the characteristics associated with consumer exposure to advertisements in the magazines.

One conventional method of measuring exposure characteristics involves creating and distributing surveys in which a sample of participants or respondents in a study are asked questions about what they read or saw. The surveys may be consumer-driven, where a consumer compiles a diary of information about what they have seen or answers questions from a preconfigured survey. However, such techniques put a substantial burden on the consumer to record exposure data and often result in incomplete or inaccurate records.

Alternately, surveys may be researcher-driven and involve a staff interviewer who may contact a random sample of respondents to discuss their exposure to various forms of media. However, such techniques rely on the memory of the consumer, which may result in inaccurate data and necessitate additional personnel/training costs. For certain forms of digital media, data acquisition may be incorporated into software that records characteristics associated with a consumer's web navigation. A key disadvantage of this method is that consumers may be very concerned about data privacy issues. Yet another conventional approach to data acquisition involves incorporating a data capture element into a data capture module that is worn by an individual and collects data transmitted from transmitters inserted into magazines. This approach requires a consumer to wear the recording device and consequently, significantly burdens the consumer.

BRIEF SUMMARY OF THE PRESENT INVENTION

Aspects of the present invention are directed to methods, systems and apparatuses for acquiring data associated with consumer exposure to various types of media. In an implementation, a system acquires data related to whether a consumer has viewed or had an opportunity to view certain magazines or pages of a magazine. As discussed in greater detail below, various implementations of the system facilitate significant flexibility to collect a variety of interaction data, including whether a particular magazine has been opened, whether a particular page was viewed, indications of how many times a particular page/magazine was viewed/opened or any other number of interaction characteristics.

Implementations of the invention may vary based on the particular needs of the entity interested in obtaining and analyzing exposure data characteristics. For example, if cost is a primary concern, the system may be configured as a magnetic and/or chip-less data acquisition and analysis solution. On the other hand, if a broad range and volume of exposure data is important, the system may be implemented as a chip-based data acquisition and analysis solution. Advantageously, the invention facilitates significant flexibility and may be implemented as a real-time data acquisition solution or a cumulative exposure data acquisition solution for collecting readership data and exposure information. Moreover, the present invention and associated method obviates the use of surveys and interviews and in some embodiments does not require consumers to wear any type of data monitor or data collection device.

Examples of the system's flexibility are illustrated by three of the various implementations of the system that may be configured for either real-time or cumulative exposure data acquisition. For instance, the system may be implemented as a battery and radio transmitter based solution (e.g., illustrated in FIGS. 3A-3B), a battery-coupled to a circuit of active elements (e.g., illustrated in FIGS. 4A-4B) or a chip-less solution (e.g., illustrated in FIG. 5A-5B). Although, the systems are discussed herein as separate embodiments, it is also to be understood that aspects of the systems may be combined or omitted in order to meet the needs of a particular system user.

Furthermore, it is to be understood that the various data acquisition configurations discussed herein may be further modified to incorporate additional/alternate hardware to implement media data acquisition. For example, instead of electromagnetic marker/sensor elements, implementations of the system may be based on magnetic sensors (or various combinations of magnetic and electromagnetic elements). The magnetic data acquisition system may incorporate a permanent magnet and/or one or magnetic reed switch(es), hall effect sensor(s), or magnetoresistive sensor(s). As an example, a permanent magnet may be mounted on an opposing face of the magazine cover so that when the cover is opened or closed (depending on the particular implementation) the permanent magnet will overlap the magnetic sensor and thereby, trigger a sensing event. Implementations incorporating these or other magnetic acquisition elements may have reduced power usage characteristics and/or have a smaller footprint within the printed media and/or a printed media sleeve.

An implementation of the present invention is directed to the acquiring data related to consumer/printed media interaction acquired by a data reader. These elements are configured to respond to and record aspects of consumer interaction with the printed media. For example, in an implementation the system may be configured to obtain a duration of time that a particular magazine or even a particular page of a magazine is opened.

BRIEF DESCRIPTION OF THE DRAWINGS

FIGS. 2C-2D illustrate a printed media sleeve incorporating marker regions and sensor elements in accordance with an embodiment of the invention;

FIGS. 2E-2F illustrate a printed media sleeve incorporating marker regions and sensor elements in accordance with another embodiment of the invention;

FIGS. 2G-2I illustrate examples of sensor element/marker region configurations in accordance with three embodiments of the invention;

FIG. 3A is a block diagram illustrating a marker region incorporated into printed media and a sensor element according to a first embodiment of the invention;

FIG. 3B is a block diagram illustrating a marker region incorporated into a printed media sleeve and a sensor element according to a first embodiment of the invention;

FIG. 3C is a high-level flow diagram of the exposure data acquisition solution illustrated in FIGS. 3A-3B.

FIG. 4A is a block diagram illustrating a marker region incorporated into printed media and a sensor element according to a second embodiment of the invention;

FIG. 4B is a block diagram illustrating a marker region incorporated into a printed media sleeve and a sensor element according to a second embodiment of the invention;

FIG. 4C is a high-level flow diagram of the exposure data acquisition solution illustrated in FIGS. 4A-4B.

FIG. 5A is a block diagram illustrating a marker region incorporated into printed media and a sensor element according to a third embodiment of the system;

FIG. 5B is a block diagram illustrating a marker region incorporated into printed media sleeve and a sensor element according to a third embodiment of the invention;

FIG. 5C is a high-level flow diagram of the exposure data acquisition solution illustrated in FIGS. 5A-5B.

FIGS. 6A-6B illustrate aspects of a data reader according to an embodiment of the invention;

The leading number of each reference number within the drawings indicates the figure in which that reference number is introduced and/or detailed. As such, reference number 101 is first introduced in FIG. 1. Reference number 201 is introduced in FIG. 2, etc.

DETAILED DESCRIPTION OF THIS INVENTION

For the purposes of illustration, embodiments of the invention directed to data acquisition of exposure data associated with printed media will be discussed in a magazine readership determination/exposure data acquisition context. However, it is to be understood that aspects of the embodiments discussed herein may be customized and configured to meet the particular needs of other applications. For example, aspects of the invention may be customized to facilitate exposure data acquisition in other forms of print media, such as billboards, books, catalogs, or newspapers. Moreover, the actual types of data acquisition technology may be further adapted or configured to fit the needs of alternate forms of media (e.g., the system may be configured to facilitate exposure data acquisition by implementing larger scale wireless communication systems or optical data processing depending on the particular media exposure characteristics of interest).

Figure 1:
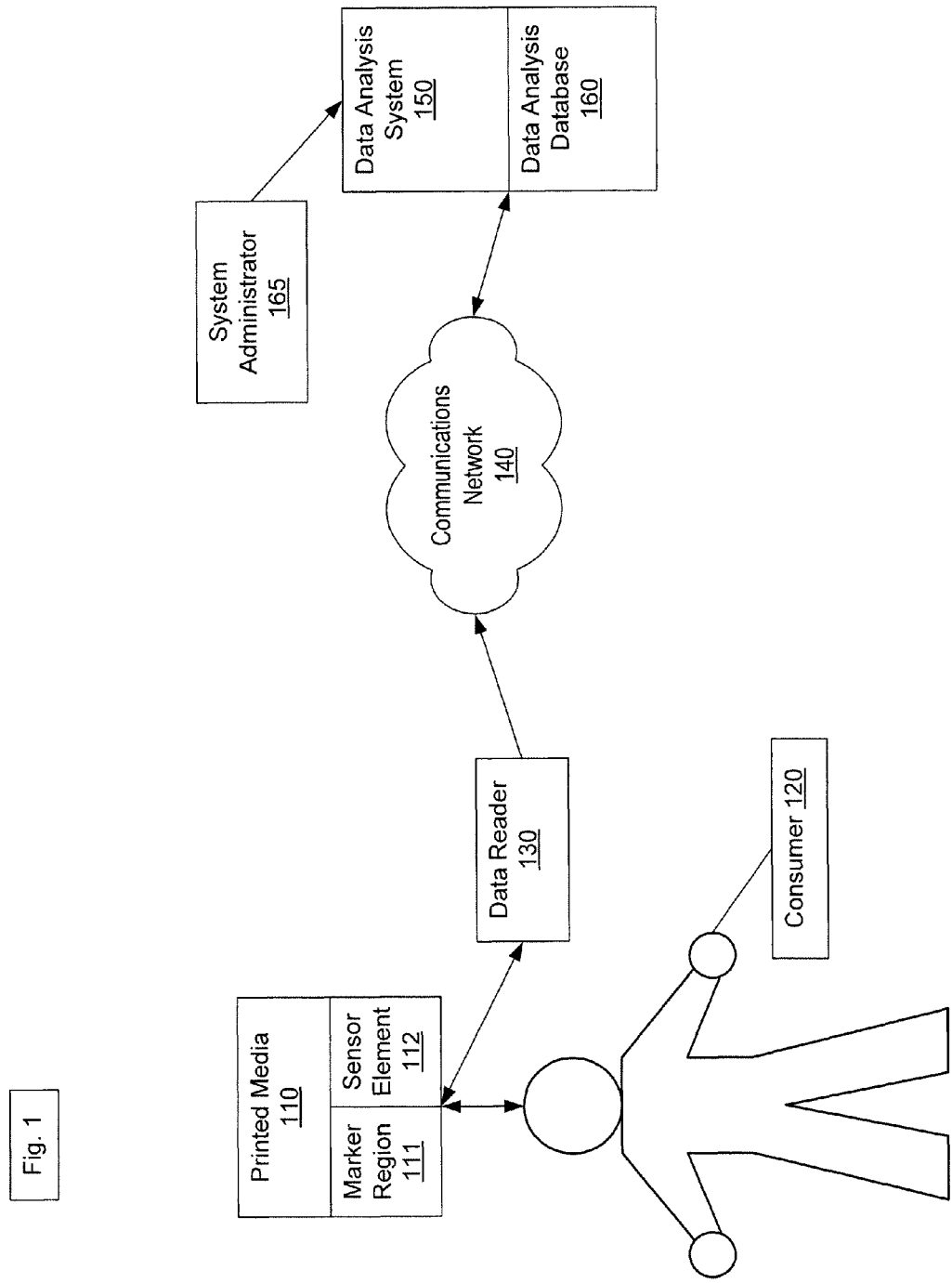
FIG. 1 illustrates a high-level diagram of components involved with various implementations of the system.

FIG. 1 illustrates a functional block diagram of a flexible media exposure data acquisition and analysis (F-MEDAA) system in accordance with the invention. FIG. 1 illustrates front-end data acquisition components and the back-end data analysis components of the F-MEDAA system. More specifically, according to an embodiment of the invention, the F-MEDAA system involves the acquisition and analysis of characteristics associated with interactions between printed media (and/or in some instances printed media sleeve) 110 that incorporate marker regions 111 and sensor element 112 and an individual 120 (or group of individuals) exposed to the printed media 110. For the purposes of illustration, printed media 110 and individual(s) 120 will be described herein as a magazine, (and/or a magazine sleeve) 110 and a consumer 120, respectively.

Another element of the data acquisition portion of the F-MEDAA system is data reader 130. It is to be understood that this element may be configured as a wide variety of a data acquisition/capture, extraction and distribution elements selected based on the need of a particular implementation. In various embodiments, the data reader may be an independent data acquisition component, a data acquisition component integrated as part of a printed media 110 rack, a data acquisition component integrated with a piece of furniture such as a coffee table, or any other number of data acquisition components. Generally, the data reader 130 interacts with the printed media 110 capturing the consumer exposure data and transferring the data to a data analysis system 150. In the embodiment illustrated in the FIG. 1, the data analysis system 150 and data analysis database 160 receive the acquired data from the data reader 130 by way of a communications network 140.

However, it is to be understood that the system may be configured to meet the needs of any number of users. Instead of being connected with a communication network, the data reader 130 may be configured with a data storage component (e.g., any type of memory device). The communications network 140 is an optional component of the F-MEDAA system. Exposure data may be captured by a data reader and transferred to a local consumer's computer for processing and subsequent transfer to a centralized database. Alternately, a consumer may physically transfer the sensor element 112 from printed media 110 or a data storage device (e.g., flash memory drive) that stores data extracted from printed media, to a remote location. For example, the consumer may mail the sensor element, the entire printed media, or the data storage device to a central receiving unit, where a system administrator 165 facilitates the data extraction/analysis process (or in some implementations the process of mailed data extraction may be automated). Alternately, instead of mailing back the data acquisition elements, in some implementations a data retrieval technician may periodically visit the consumer's location to collect the sensor cards, the media elements e.g., magazines and/or magazine sleeves), and/or the data storage devices or download the data to a portable data storage element.

In some implementations, the present invention is configured with sensor elements 112 that are electromagnetic sensor elements and/or magnetic sensor elements alone or in combination with permanent magnets. The sensor elements may be embedded into the printed media and/or printed media sleeve (e.g., magazines, catalogues or newspapers are some non-limiting examples) as a means of detecting and recording person's exposure to certain portions of interest within the printed media. For example, consumer exposure characteristics associated with a particular magazine and/or advertisement may be analyzed as part of market research estimating the size of magazines' audiences and/or the effectiveness of magazine advertising.

In implementations when printed media and printed media sleeves are used to acquire consumer exposure data, the system may also include a media/media sleeve match detection component. The match detection component may be incorporated as part of the data reader 130, part of another system component or it may be configured as an independent system element. Regardless of the implementation, the match detection component detects when a printed media element is mismatched with a printed media element sleeve. The detection may be achieved any number of ways. For example the detection component may verify that the RFID tag applied to the printed media element corresponds with an expected RFID tag applied to the printed media element sleeve. In an additional implementation, the detection component may be incorporated into the printed media element sleeve and configured to detect media identification elements are associated with a particular media element(s).

Figure 2A:
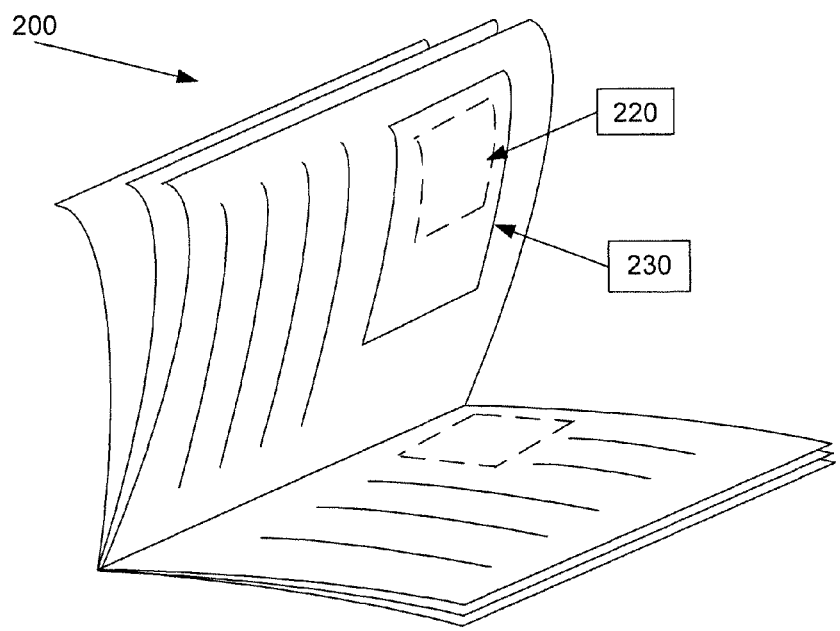
FIGS. 2A-2B illustrate printed media incorporating marker regions and sensor elements in accordance with an embodiment of the invention.
Figure 2B:
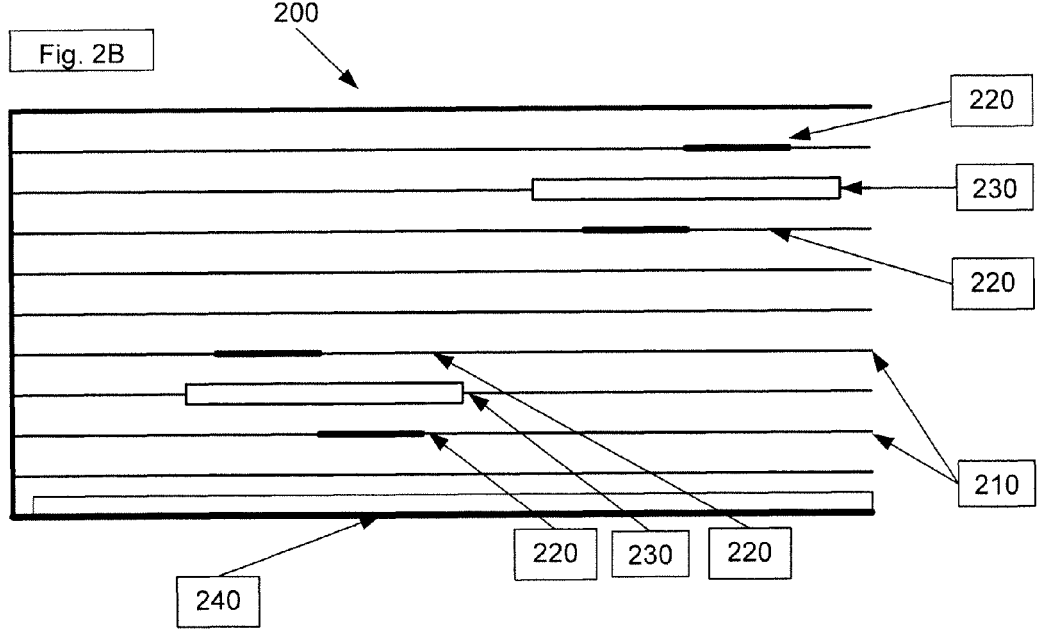

FIGS. 2A-2B illustrate a perspective view and a side view, respectively, of an example of printed media 200 incorporating marker regions 220 and sensor elements 240. In FIG. 2A, the magazine 200 is open to a particular page of interest. For example, advertisers may want to determine the efficacy of certain advertisements. As illustrated, printed media 200 may include marker regions 220 (shown as dashed lines in FIG. 2A). The marker regions 220 help indicate when certain parts of the printed media that are of particular interest, such as advertisement 230, are exposed to a consumer (the process will be described in greater detail below).

Depending on the particular implementation, the marker regions 220 may be created in an number of ways, such as by applying a conductive ink to the paper before or after the advertisement 230 is printed on the page. In some embodiments, the conductive ink may be incorporated into the ink used to print the advertisement 230, itself. Depending on the particular implementation, marker regions 220 may be printed on pages of printed media 200, in some implementations on particular pages of interest. Accordingly, it is possible for an advertiser or publisher to determine whether a consumer has opened a particular magazine, whether the consumer has been exposed to particular pages of interest, or a variety of other types of exposure information.

FIG. 2B illustrates an alternate marker region 220 arrangement. In magazine 200, again advertisement 230 has been designated as an area of interest. In FIG. 2B, the marker regions 220 are printed on the page prior to and the page following the page of interest 230. As illustrated, the marker portions are offset with relation to each other, but share a common (vertical) axis with the advertisement 230. According to one embodiment, the printed media may be removed from the print run, and the conductive ink may be added to a designated number of specific pages to create the marker regions included in the printed media.

Furthermore, similar to that shown in FIG. 2A, the marker region 220 is located in a similar position on the page as the area of interest. It is to be understood that the size of the marker portion 220 may vary depending on the particular implementation. For example, if there are several areas of interest (advertisements) in a particular media element, the size of the marker portions may be minimized to the extent possible. The minimization allows more areas of interest to be included with the layout of the magazine, while also minimizing the possible effect of interference between marker regions.

FIG. 2B, also illustrates an implementation of sensor element 240. The sensor element 240 discussed herein may be configured as a set of electromagnetic sensors in the form of a "sensor card" or "sensor label." The sensor elements 240 are used to monitor the presence of the electrically conductive marked regions and determine if they are separated (or displaced from one another), for example the marker region is effectively displaced in relation to the sensor element when a consumer opens the printed media 200 and/or exposes certain pages of interest 230 within the marked media element 200.

Marker portions 230 are in an initial spatial relationship to sensor element 240 as illustrated in FIG. 2B. The opening of printed media 200 and turning of pages 210 alters this initial spatial relationship between marker regions 220 and the sensor element 240 such that an electromagnetic event occurs that can be recorded as data corresponding to the act of the turning of pages 210.

FIGS. 2C-2D illustrate a perspective view and a side view, respectively, of an example of a printed media element 200 and a printed media sleeve 205 (e.g., plastic cover, magazine holder, and/or the like) both incorporating marker regions 220 and/or sensor elements 240, 242. In FIG. 2C, the magazine 200 is inserted into the sleeve 205 by sliding the front and back covers into sleeve pockets as indicated by the bold arrows. A variety of other methods of affixing a sleeve to a magazine or other printed media are envisioned within implementations of the present invention (e.g., fasteners, adhesives, binding, and/or the like). In this implementation, sensors and/or marker regions may be included on both the magazine pages 210 and/or the sleeve 205.

For example, FIG. 2C shows marker regions 220 on magazine pages near an advertisement 230, as well as a marker region 222 on the sleeve 205. In one implementation, sleeve marker regions 222 may be formed in a manner similar to magazine page markers. For example, conductive ink used to print magazine page marker regions may also be used to print marker regions on the sleeve (e.g., in the form of designs, logos, magazine titles, text, and/or the like). In another implementation, sleeve marker regions 222 may be designed to indicate the type and/or title of magazine to which the sleeve has been affixed. In yet another implementation, sleeve marker regions 222 may be designed to minimize obstruction of the underlying magazine cover. For example, a transparent or translucent marker region may be created and applied to the inside cover of the sleeve 205.

FIG. 2D illustrates a side view with an alternate magazine page marker region 220 arrangement. In the magazine's pages 210, the advertisement 230 is again designated as an area of interest, with marker regions 220 printed on the page prior to and the page following the page of interest 230, with offset positions similar to that discussed for FIG. 2B. A magazine sensor element 240 is affixed to the back page of the magazine. In this case, there is also a magazine sleeve 205 with marker region(s) 222 and sensor element(s) 242 affixed thereon.

In one implementation, the sleeve marker region(s) 222 and/or sensor element(s) are offset with relation to the magazine marker region(s) 220 and/or sensor element(s) 240 to facilitate disambiguation of sensor signals corresponding to sleeve 205 and magazine pages 210. Marker regions and/or different sensor elements may be reduced in size to the extent possible in some implementations to reduce or eliminate mutual interference. In another implementation, there are no magazine sensor elements 240 and both magazine marker regions 220 and/or sleeve marker regions 222 are implemented in sleeve 205 along with the sleeve sensor element 242. In yet another implementation, there is no sleeve sensor element 242. In this implementation because there is no sleeve sensor element 242, both magazine marker regions and sleeve marker regions 222 interact with some portion of the magazine sensor element 240.

While marker regions 220 and/or sensor elements 240 within magazine pages 210 may be configured to indicate that a particular page or pages are being viewed, sleeve marker regions 222 and sensor elements 242 may be configured to indicate that the entire magazine has been opened or closed. Sleeve affixed markers and sensors have the further advantage of allowing data collection on magazines that are inserted into the sleeve but that otherwise have not been prepared in advance with marker and/or sensor elements. In one implementation, data collected from magazine sensors and sleeve sensors are transmitted across a communication network for processing or stored in separate data storage elements, (e.g., flash memory devices) that may be mailed in to a data processing entity for subsequent data extraction. In another implementation, data collected by magazine sensors and sleeve sensors are configured with different data acquisition characteristics (e.g., different ranges of capacitances in a capacitor-sensor embodiment) to facilitate subsequent disambiguation during data processing.

In an implementation of the system, the system incorporates a match detection component. The match detection component may be configured to verify that the media element 200 corresponds with media sleeve 205. For example, the match detection component may be configured to verify that the right magazine is inserted into the right magazine sleeve 205. This type of consistency check bolsters the confidence in the data acquired by the system. In some implementations, the match detection component may be configured with an indicator (e.g., an LED indicator) to display a match status. Accordingly, when a mis-match is detected, a system user may be alerted.

Alternately (or in addition to the LED alert indicator), the match detection component may generate a mis-match alert message that is transmitted across a communication network. Upon receiving a mis-match alert message, a system administrator may dispatch a system technician to investigate the issue or contact a system host entity to alert them of the issue.

The system may be also configured to generate a system fault alert (e.g., either lighting an LED alert indicator or transmitting a fault alert message to a system administrator that may indicate the type of fault detected). For example, the system may be configured to transmit a fault alert when a media-mismatch is detected, when one of the sleeves or media elements is not transmitting data, or if an expected media element or media element sleeve is missing. Furthermore, if a fault is detected, the system may be configured to transmit a system fault message or activate a fault alert LED, that indicates to an office manager/system user that a media element/media element sleeve battery may be dead or that a media element/media element sleeve may be missing or mis-matched in a variety of instances. This may be useful in implementations in which the system is not connected with a communication network for data transmission.

FIGS. 2E-2F illustrate a perspective view and a side view, respectively, of an example of a printed media sleeve 205 incorporating marker regions 222 and/or sensor elements 242, without corresponding markers or elements in the magazine pages 210. In FIG. 2E, the magazine 200 is again inserted into the sleeve 205 by sliding the front and back covers into sleeve pockets as indicated by the bold arrows. A sleeve marker region 222 is indicated as well. FIG. 2F shows sleeve with marker region 222 and sensor element 242. This configuration of the system data acquisition elements may be used to provide media based exposure data acquisition data (instead of or in addition to specific page exposure). For example, a magazine publisher may utilize the system to simply determine media based exposure data, such as whether a magazine has been opened, the number of times that a particular magazine has been opened and for how long, at a particular location or a plurality of locations.

The flexibility of the system allows a publisher to better focus their resources and select a system configuration that meets their needs. For example, a publisher or advertiser that is interested in exposure performance data associated with a particular article or advertisement with in a media element may prefer the configurations illustrated in FIGS. 2A-2D. However, a publisher interested in broad readership exposure data may save resources by selecting the configuration illustrated in FIG. 2C-2C or 2E-2F which may be tailored to determine how often a particular magazine has been opened and for how long.

In another configuration, the magazine 210 from FIG. 2F may be configured with a marker region or sensor element that is utilized by the system simply to confirm that the correct magazine is in the correct magazine sleeve. The functionality necessary to achieve this type of determination may be accomplished by either a match detection component (discussed above) or specially configured sensor elements 242 incorporated with sleeve 205. This type of specially configured sensor element 242 may be configured to identify a specific type of marker or sensor element associated with a particular media element 200.

FIGS. 2G and 2H illustrate the interaction between sensor element 240, 242 and marker region 220, 222 in greater detail. In an implementation, marker regions 220 are located on different pages of a magazine, for example as illustrated in FIGS. 2A and 2B. The marker regions 220 can either be a region of electrically conductive material, which may or may not be printed, such as carbon ink, silver ink, or electrically conductive polymer material. The sensor element 240 may include elements such as a electronic sensing circuit, microcontroller, memory, battery, real-time clock, or a magnetic sensor, such as a reed switch, hall-effect sensor, magnetoresistive sensor or a variety of other sensors alone or in conjunction with one or more permanent magnets depending on the particular implementation. As an example, a permanent magnet may be mounted on an opposing face of the magazine cover so that when the cover is opened or closed (depending on the particular implementation) the permanent magnet will overlap the magnetic sensor and thereby, trigger a sensing event.

FIGS. 2G and 2H illustrate an implementation of the electronic chip 245 that may be incorporated with the sensor element 240. The sensor element 240 may be implemented to facilitate capacitive coupling with the marker regions 220 (illustrated in FIG. 2G) or inductive coupling with the marker regions 220 (illustrated in FIG. 2H).

As illustrated in FIG. 2G, sensor element 240 contains one or more electrically conductive electrodes 225 that are capacitively coupled to the marker regions 220. In FIG. 2G, the electronic chip 245 measures the relative capacitance of each sensor electrode 225. Also, FIGS. 2G and 2H illustrate an antenna that may be incorporated into certain embodiments of the sensor element to assist in the transfer of exposure characteristics. The marker regions 220 are designed and placed such that they overlap with specific electrodes 225.

The proximity of the marker elements to the sensor element will change the capacitance of one or more electrodes 225 of the sensor element 240.

FIG. 2H illustrates an inductive sensor element 240, in the inductive implementation, sensor element 240 contains one or more conductive loops 235. The marker regions can be either a patch of conductive material, as shown in FIG. 2G, or in some implementations can also be in the form of loops. In one embodiment in the inductive case, the marker regions may also be implemented as resonant circuits. In the embodiment illustrated in FIG. 2H, electronic chip 245 measures the relative inductance of each sensor electrode. The proximity and/or displacement of the marker regions 220 in relation to the sensor element 240 will change the inductance of one or more electrodes of the sensor element 240. Additionally, FIG. 2I illustrates a configuration of the marker regions 220 with respect to the sensor element 240, as well as the sensor element's sensing circuitry 225, in accordance with the components illustrated in FIG. 5A-5C.

There are various ways that electronic chip 245 can measure the inductance and changes in the inductance. One method of measuring the change in inductive characteristics involves creating a circuit such that each loop in the sensor element 240 is part of a resonant oscillating circuit. It is then possible to measure the change in frequency or detuning caused as the marker region 220 moves closer to the sensing loop 235. Advantageously, the oscillating resonant circuit is a sensitive and inexpensive solution.

Advantageously, in some embodiments the system's flexibility facilitates acquisition of data throughout printed media's complete life cycle as cumulative exposure data acquisition. Alternate implementations of the system may facilitate data acquisition over discrete points in time or at discrete page-turning events. Furthermore, aspects of the invention facilitate more comprehensive market data acquisition, the processing of exposure information/characteristics associated with the pages of magazines that consumers read, the dates and/or times that consumers read particular marked media elements, the number of times an advertisement is exposed to a consumer(s), as well as the extent to which consumers are exposed to a particular instance of media content.

Various embodiments of this invention may also be configured to incorporate data acquisition for market research related to the times/durations that consumers are exposed to particular pages, the time and/or dates consumers have a particular magazine, the number of times consumers pick up particular magazines. An embodiment of the present invention associates a unique identifying code with the data recording element to identify the title and issue date of a magazine. Accordingly, the acquired exposure data may be analyzed to track cumulative exposure to a publication—and the total duration of time one or more consumer(s) spent with it.

In FIG. 2B, sensor element 240 may be configured as an electromagnetic sensor. In some implementations, the electromagnetic sensor or other type of sensor elements may include additional components and/or sensor elements that work in conjunction with an electromagnetic antenna and an optional electronic chip, a battery or in some implementations data storage memory. It is to be understood that a wide range of electromagnetic, magnetic or other types of sensors may be implemented based on the particular application and needs of a user (i.e., short/mid/long-range wireless communication elements may be implemented as the data recording element). However, for the purpose of illustration, a short range solution, like Radio-Frequency Identification (RFID) sensors, will be discussed herein.

By way of example only, the RFID sensors discussed herein may be packaged in the form of a thin card or label that can be inserted into a magazine as a sensor element 240 and affixed to by non-limiting example: the pages, binding, a magazine holder/sleeve into which a magazine is bound (as illustrated in FIGS. 2C-2F), front cover, or back cover of a magazine (as illustrated in FIG. 2B). As the sensor element 240, the RFID sensor card or other type of sensor element registers information (printed media exposure data) regarding when the magazine was opened. The sensor element 240 may also be used to detect if certain pages (or elements on a page) in the magazine have been opened. The RFID sensor card's spatial displacement in relation to the marker region indicates that portions of interest of the printed media are exposed to the consumer.

In an alternate implementation, the sensor element may be configured as a chip-less RFID tag, packaged in the form of label and inserted into the printed media. When the magazine is placed near an RFID tag reader, the sensor element may be configured to change its own characteristics to reflect particular printed media exposure data by sensing alterations in the marker region conductive ink printed in the magazine (as described in FIG. 2G or 2H).

In particular implementations wherein marker regions and/or sensor elements are incorporated into a magazine sleeve, measures may be taken to promote the uniformity of magazine identities (IDs) inserted into that sleeve and/or to detect those magazine IDs (e.g., a match detection component). In another implementation, a magazine identifier may be printed on a magazine sleeve, instructing users of the particular title, type, subject, and/or the like of magazine to be inserted into that sleeve, thereby increasing the likelihood that the usage/exposure data collected from that sleeve will be based on the same magazine and/or similar types of media. In another implementation, a sensor element on the magazine sleeve may detect a marker region on a magazine inserted into that sleeve. If the marker region on the magazine does not match a set of preset matching conditions, the usage/exposure data acquired based on that magazine may be disregarded. Furthermore, the sensor card may be configured to only acquire exposure data from recognized media elements (e.g., magazines that match determined matching conditions). In some implementations, preset matching conditions may comprise a particular value or set of values of capacitance or inductance.

As described below, the system may be configured to acquire exposure data according to either a real-time data acquisition process or a cumulative exposure data acquisition process. The sensor element 240 may be configured in one of at least three ways: an internal battery powered RFID sensor element (as in FIGS. 3A-3B); an battery powered RFID sensor element that is charged from an external source (as in FIGS. 4A-4B); and/or a sensor element does not incorporate a battery (as in FIGS. 5A-5B).

A first embodiment of the sensor element, shown in FIG. 3A, implements a sensor card or label 310 in magazine 300 that includes an RFID tag, a battery 320, and an internal clock/memory 330, in addition to capacitive sensing circuitry 335. Depending on the particular implementation, the battery 320 may be a thin-film type, a coin cell type, or a variety of other thinner batteries. Also, depending on the power requirements for the implementation, the battery may be rechargeable or non-rechargeable. RFID sensor card 310 can be mounted into the spine of the magazine or a plastic cover/magazine holder. RFID sensor card 310 may also be mounted with a perforated edge 315 so that it can be torn out of magazine 300 and also able to record the date and time at which it is detached from the magazine 300.

The capacitive sensing circuitry 335 consists of several electrically conductive electrodes which function as near-field antennas and wirelessly detect the presence of the electrically conductive marker regions dispersed on different pages within the magazine. It is to be understood that the sensor card 310 does not need to have electrical contact with the marker regions 340-360, but is simply capacitively-coupled to the marked portions distributed throughout the marked media element (as in FIGS. 2B, 2G).

An internal clock 330 illustrated in FIG. 3B may be used to create time stamping data. This time stamping data may be correlated with particular exposure events. The RFID sensor card 310 can be bound into magazines as an insert detachable by perforations 315. As indicated in FIG. 3C, after a predetermined time for printed media exposure data collection has passed 370, the consumer may detach RFID sensor card 310 from magazine 300 by perforations 315 and mail the card to a data processing entity 390. Or in some implementations, magazine 300 in its entirety may be physically sent (by, for example, mail) 380 to central data extraction system 390 for analysis of the media data collected. In another implementation, the data reader may be configured with a data storage device. As such the technician may visit each remote site to collect the data storage devices and/or collect simply the data stored on the data reader. In a similar implementation, the data storage device (e.g., a flash memory drive) may be mailed to the central data extraction system.

In an embodiment illustrated in FIG. 3A, the RFID sensor element 310 operates autonomously. This allows the magazine to be placed in a single location for a relatively long time or moved to other locations and returned to the original location as the card 310 continues to record usage/exposure of the magazine 300. In addition, it may be possible to recycle these cards after the data have been extracted in step 390. In this first embodiment, the RFID card 310 is an entirely self-contained sensor element that may be configured to record data including an internal memory 330 and clock. The sensor element 310 may be comprised of capacitive elements which detect changes in the characteristics of conductive ink patches 340-360 that are capacitively coupled to the capacitive sensor elements.

Over the time of the study, the sensor card records the sensor events as exposure events. In this embodiment, the sensor card can serve as a data logging device; the sensor card can store the date and time of every instance in which the marked pages are opened and closed, as well as additional printed media exposure data. Further, it is to be understood that thin film battery may be substituted with a rechargeable battery or a coin cell battery, that may be recharged by the data reader.

FIG. 3B illustrates an implementation wherein the sensor card is incorporated into a magazine sleeve 305 (e.g., plastic cover, magazine holder, etc.) into which the magazine 300 is inserted. The sensor element may be positioned in a range of configurations based on the requirements associated with various implementations. For example, the sleeve 305 may be configured with the sensor element 310 near the front cover, back cover, or spine of the sleeve 305 in various implementations.

FIG. 4A illustrates, a second embodiment, which involves the use of a sensor card 410 that contains one or more passive electromagnetic resonant circuits 445, 455 and 465. In this case, the electrically conductive marker regions 440, 450 and 460 are positioned to detune one or more of the resonant frequencies of the sensor card's passive sensor circuit 445, 455 and 465 and thus provide a means of electromagnetically detecting and monitoring the presence and movement of the marker regions 440, 450, and 460. It should be noted once again that this embodiment does not require any electrical contact between the marker regions and the sensor card 410 (and that as illustrated the marker regions are situated at various points in magazine 400 and are not elements within the RFID Sensor Card 410—indicated by the dashed lines of the marked portions).

FIG. 4A illustrates the sensor element as RFID card 410 with a rechargeable battery 420 or other power source that can be bound into magazine 400. Advantageously, in this embodiment the magazine 400 may be placed onto or within wireless communication distance of a local data reader (e.g., a home networking device or data acquisition/storage device) in step 473 from FIG. 4C that may be configured as a magazine rack (as shown in FIGS. 6A-6B), other household appliance (e.g., coffee table as shown in FIGS. 7-8) or consumer electronic product.

FIG. 4B illustrates a second embodiment of a sensor card, wherein sensor card 410 is incorporated into a magazine sleeve 405 (e.g., plastic cover, magazine holder, etc.) into which the magazine 400 is inserted. The sensor element may be positioned near the front cover, back cover, or spine of the sleeve 305 in various implementations.

FIG. 4C illustrates the data acquisition process associated with a consumer reading a magazine or printed media 400 incorporating this type of RFID sensor card 410. When the consumer replaces the magazine in step 473 into or leaves the magazine within signal detection range of a data extraction/distribution element (e.g., reader element), a reader device containing embedded sensors, the reader device extracts/processes the data from the RFID sensor card 410. The data reader may subsequently transfer the data back across a communications network 475 to a remote analysis system where it could be further processed and analyzed in step 480.

In a further optional aspect of this embodiment, the data reader may be an independent system component, embedded in the magazine rack (as in FIGS. 2A-2B) or incorporated with a coffee table (as in FIGS. 7-8). In some implementations, data reader, (e.g., the magazine rack, coffee table) may also be configured to facilitate recharging of the battery inside the RFID sensor card when the magazine is within a certain battery recharge range. In a variation of the first and second embodiments, the reader device can also be used to detect and scan other RFID tags that may be carried by a person (e.g., a keychain, bracelet or belt buckle as in FIGS. 7 and 8). This would provide some means of identifying a person in proximity to the reader device and possibly incorporating personal demographic data as part of the exposure indicator data.

In a variation of the coffee table or magazine rack data reader embodiments, the data reader may be an independent system component. For example, the magazine does not have to be placed right on or next to the data reader in order for the exposure data to be pulled from the extraction/distribution element. The data reader may be configured to extract the exposure data from the sensor card from a distance that may vary significantly depending on what type of data transmission protocol is implemented. For example, in some implementations, the system may be configured to acquire data if and when the magazine may is placed in the same room as the extraction/distribution element.

The data reader does not necessarily have to be physically connected to the RFID sensor card 410 or rechargeable battery 420 in order to recharge the battery. As long as the data reader is connected to a phone jack/network port and/or an electrical outlet, the extraction distribution element can accomplish both duties as a power supply for the RFID sensor card 410 and the data distribution point sending the data to the data analysis system in step 480, respectively.

Since the sensor card may not be configured with electronic data circuitry, the electromagnetic signals of the marker region/sensor elements may be read in real-time when the magazine 400 is placed into or within a wireless communication range with the data reader (e.g. embedded in a coffee table where the magazine is read as in FIGS. 7 and 8). According to an embodiment, the data reader (e.g., electronic scanner device or receiver), may collect exposure data from one or more magazines 400.

The marker portion 440, 450 and 460 may be configured as a special type of electrically conductive ink that undergoes a gradual, but permanent change in electrical conductivity when exposed to air or light. Since this causes a permanent shift in the resonant frequency of one of more sensor card elements 445, 455, and 465, the magazine 400 can be scanned/analyzed at a later time to ascertain the exposure activity.

Data Reader 130 may be configured to interact with RFID sensor elements/cards 310 and 410 (in FIGS. 3A-3B and 4A-4B) to acquire exposure data from which it may be possible to determine: (a) the identity of the magazine—its title, issue date, and the specific copy of the magazine into which it was bound; (b) the date and time of day of each occasion that the magazine was opened; (c) the amount of time that the magazine was opened on each occasion that it is opened; (d) the date and time of day of each occasion at which the magazine was opened to a page on which specially-designed conductive ink has been applied; and (e) the amount of time that the magazine is opened to that page on each occasion.

An RFID sensor element embodiment illustrated in FIGS. 5A, 5B, and 5C involves the use of a sensor card 510 or label which contains one or more resonant circuits 525, 535, or more passive RFID chip tags 515 (As illustrated in FIGS. 5A-5B, the dashed lines around marked region 520 indicate that the marked regions are not included as part of the sensor card 510). The addition of the passive RFID tag 515 provides a means of uniquely identifying a very large number of sensor cards of labels.

Passive RFID sensor elements facilitate cumulative exposure data acquisition. For example, the passive element can measure exposure characteristics, when a magazine is returned to a fixed location, such as a magazine rack or a coffee table that is configured with a data reader. In that instance, the RFID sensor element 510 embedded in the magazine 500 need be only an RFID tag 515 (e.g., an antenna). Advantageously, the RFID sensor element 510 would not need a battery or a computer chip. In this type of implementation, the RFID sensor element may include at least one passive resonant circuit 525.

Interactions between the capacitive sensory characteristics of marker region 1520 and the resonant circuit 525 would effectively detune resonant circuit 525 as a consumer reads the magazine 500 in step 570. When the magazine was returned to a data reader in step 573, the sensory electronics in the data reader interact with the detuned resonant circuit 525. In turn, the electronics in the data reader could be configured to determine when and to what extent the circuit 525 is detuned. These types of data may be analyzed to determine exposure characteristics. In alternate embodiments, the printed media may include marker regions, with sensor elements (resonant circuits) 510 incorporated into a data reader.

FIG. 5A shows a chip-less RFID tag 510 (i.e. an electromagnetic antenna) without a battery or internal clock that may be bound into a magazine 500. When a magazine with such a tag is placed within a proximity of a data reader, such as magazine rack 600 (in FIG. 6A), the data reader may be configured to capture and transmit data by means of an RFID tag reader incorporated as a component in the data reader via the communications network in steps 575 and 580. Chip-less RFID tag 510 of FIG. 5A, when affixed to a magazine 500, enables the indirect measurement of the cumulative amount of time that the magazine 100 was opened to a particular page on which conductive ink has been applied as a marked portion since the prior placement of the magazine in the magazine rack 600 with data reader.

FIG. 5B illustrates an implementation of the sensor card, wherein the sensor card 510 is incorporated into a magazine sleeve 505 (e.g., plastic cover, magazine holder, etc.) into which the magazine 500 is inserted. The sensor element may be positioned near the front cover, back cover, or spine of the sleeve 305 in various implementations In one embodiment, the conductive ink has quantifiable physical properties that change over time upon exposure to air. This facilitates allowing measurement of the amount of time specific pages with conductive ink as a marker region are exposed. Chip-less RFID sensor element 510, when affixed to specific pages at the beginning and end of a magazine 100, thus enables the indirect measurement of the cumulative amount of time that the magazine was opened, since its prior placement in the magazine rack. The data reader implemented as a magazine stand may be configured with multiple data reader components in order to read a series of magazines that are stored in the stand. The characteristics of the marker region and the frequency of the sensor element can also be used by the magazine rack to identify the title and issue of the magazine, among other types of exposure characteristics.

In another embodiment, the magazine 500 may be configured with a passive RFID chip tag 515 (a passive electromagnetic antenna). When the passive tag is within a certain proximity to a data reader (or external tag reader), the passive tag can derive power to transmit certain stored date so long as it remains within the proximity. Depending on the implementation, the tag may be configured to store ID information only, such as the magazine's title, issue data, and unique identifying information (such as the home or business to which it was mailed, if a subscriber copy, or the retail outlet to which it was distributed); as a tag that is configured only for sensing exposure characteristics; or a combination of the two. When a magazine 500 with RFID tag 515 is placed within communication range of a data reader, RFID tag reader therein would register the identity of the magazine 100 (title, issue date, and specific copy of the magazine into which it was placed).

Passive RFID tag 515 could also be used to indirectly sense the cumulative amount of time that a page marked in conductive ink with variable exposure capacitive characteristics had been exposed since the magazine's 500 last placement in the data reader. Alternatively, both passive RFID tag 515 and chip-less label 510 could be placed in a magazine to indirectly measure the cumulative amount of time that a page with a marked portion of conductive ink had been exposed/ opened—or, if affixed to specific pages at the beginning and end of the magazine, the cumulative amount of time the magazine had been opened—and at the same time uniquely identify the copy of the magazine that had been opened, when the magazine is placed in the electronic magazine rack.

FIGS. 6A-6B illustrate a data reader that is configured as a magazine stand 600. As discussed above, the data reader may be configured as a local exposure data extraction/battery charging module. As illustrated in FIG. 6A, the magazine stand 600 may be situated privately (e.g., in a person's home) or publicly (e.g., a public waiting room such as a Doctor's office) and configured to hold a plurality of magazines 620, each with RFID sensors elements 610. Alternately, the data reader 600 may be configured as an end table or some other type of household furniture (e.g., shown as a coffee table in FIGS. 7 and 8). Alternately, as discussed above, the data reader may be an independent system component that is configured to acquire and or store data across any number of data acquisition ranges depending at least in part on the wireless transmission protocol implemented by the data reader.

As illustrated in a side-view cross-section, FIG. 6B illustrates a magazine 620 with marker region 615 and sensor element 620. The stand includes RFID electromagnetic antenna 630 within the stand 600 situated within a certain communication distance from (e.g., adjacent to) RFID sensor element 610. The data reader 640 is configured so that it can both extract exposure data, as well as charge a battery in the sensor element 610, if necessary. Thus, RFID electromagnetic antennas 630 wirelessly communicate with RFID sensor element 610 and antennas 630 are configured as components within the extraction/distribution element for wireless transfer of media exposure data from the RFID sensor element 610.

In an alternate version of data acquisition processes discussed above, the data reader is not necessarily integrated into a magazine rack or a coffee table as shown in FIGS. 6 and 7, but instead is an independent electronic device that communicates with the data extraction system 150 from FIG. 1, (e.g., a docking stand 705). It is to be understood that the data reader 130 from FIG. 1 may be configured and incorporated with a telephone modem, wireless communication device, a personal computer, a cable or satellite TV box, or a TiVo-type digital video recorder (DVR) or any other number of electronic consumer products that are capable of communicating across communication networks. RFID sensor element 410 could have a long-life (i.e. thin-film or other) battery instead of an on-site rechargeable battery 420. Additionally, the RFID sensor element 410 could be configured with an RFID electromagnetic antenna for wireless transfer of media access data to the data reader when in wireless data transfer range.

In another variation of the data acquisition processes discussed above, the data reader could be configured with a wireless modem which would transmit the data though the cellular phone wireless network or any other communications network to data extraction system 150. In this variation, the data reader would not necessarily be physically connected with a telephone jack but would still be plugged into an electrical outlet or connected with some other power supply.

In alternate implementations, the magazine stand described above could be configured for use in a range of other public places, such as doctor's offices, beauty salons, barber shops, office waiting rooms, or other locations in which multiple magazines are set out for customers, clients, or visitors to read. Proprietors of such establishments may be recruited to participate in a study in exchange for regular monetary or non-cash incentives. A market researcher could send one of the listed public places a data reader and coordinate the data acquisition process with the assistance of the proprietor or office manager. Specifically, the manager may be asked to place all of the location's magazines in that data reader (e.g., magazine stand) at the end of every working day. Furthermore, the data acquired from a public place could be supplemented with data provided by the office managers, themselves. For example, the office manager could also be asked additional questions about the numbers of people who visit that public place on particular days or an average day, and their mix of ages and genders.

Publishers of the magazines to which the office/household subscribes could apply conductive marker portions to the magazine copies sent to the selected offices/household and could insert either sensor cards, chip-less tags, and/or passive tags into those copies, as well. The data readers would read the exposure data from RFID sensors elements placed in the magazines received by the public place/household and would then transmit these exposure data to the market researcher's servers. The market researcher could then compile ongoing, regular reports on the aggregate time spent with these magazines in public places, time spent with the pages in those magazines that have been printed with marker regions, and the numbers of times that these magazines and pages have been read over pre-specified periods of time.

An alternative embodiment would involve incorporating customized data readers inside merchandise display racks used by selected retail outlets, such as book stores, grocery stores, and airport newsstands. Conductive ink and RFID sensors elements, chip-less tags, and/or passive tags could be inserted into the magazines or other printed media and sent to these locations. The data readers in these locations would not only track exposure to marked media before they are purchased, but also could be configured to track the number of copies that have been purchased. Likewise, the data reader could be able to detect the number of copies of each tagged magazine that remain in the sale racks.

This information would be transmitted regularly to the data analysis system, where it would be analyzed and provided to various publishers. The information could also be utilized to inform a wholesaler about the aggregate exposure data, for example, the number of times a particular magazine has been opened across several different locations. The information could be developed to determine exposure characteristics for particular magazines at particular sites, as well as to determine magazines' sales at individual sites. The sales information could be used for the purpose of more timely inventory control—to alert publishers or wholesalers about possible sell-outs at specific retailers or to alert them of slower-than-expected sales which would allow them to halt production of a particular issue.

Figure 7A:
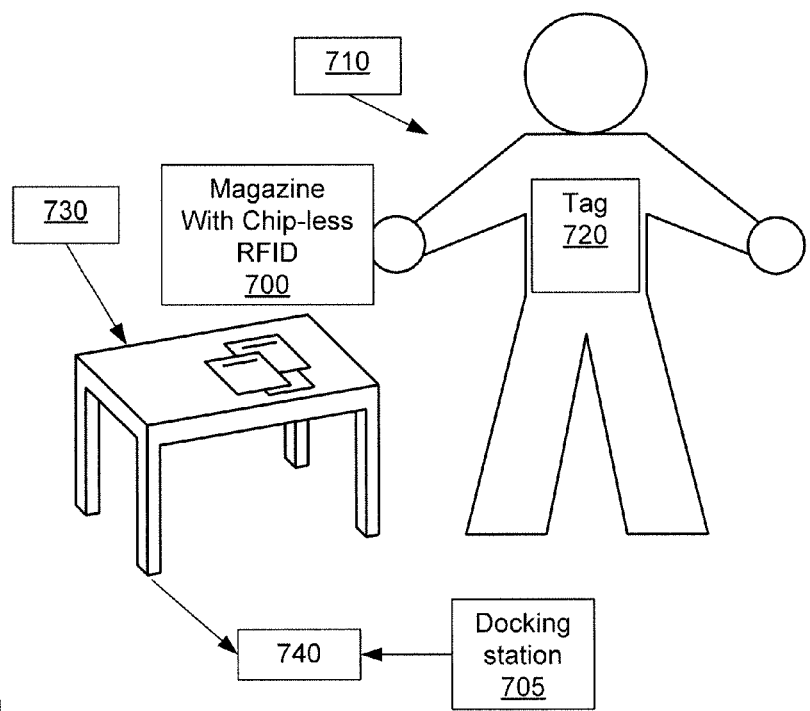
FIGS. 7A-7B illustrate aspects of a data acquisition process according to an alternate embodiment of the invention.
Figure 7B:
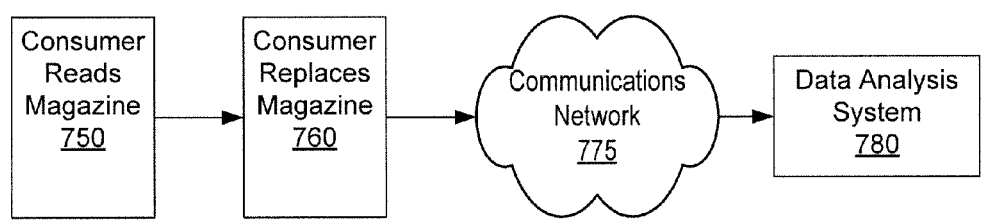

FIG. 7A illustrates an alternate implementation that is based on the sensor element 510 embodiment of FIGS. 5A-5B. As illustrated, the data reader could also be divided into two pieces of hardware 730 or 705 with communications terminal 740 in order to provide flexibility to the consumer. Another hardware data sensing device may be implemented as a consumer-side RFID tag and/or RFID tag reader 720. Accordingly, as illustrated in FIG. 7B, the consumer reads the magazine exposing marker regions in step 750. In step 760, the consumer may either place the magazine back on the data reader 730 or a tag/tag reader 720 may capture the exposure data and transmit exposure data if joined with a docking station 705 through communications terminal 740. The consumer may decide whether to carry or wear a tag/tag reader 720 depending on the research process and the particular hardware implementation. The tag/tag reader 720 may be incorporated into a portable case housing, which transmits signals to, and receive signals from, the RFID sensor cards in magazine 700. When the tag/tag reader 720 is joined with docking station 705, the station recharges the battery in the portable tag/tag reader 720 and/or transmits the data from the tag/tag reader 720 over a communications network 775 to a data analysis system 780, as illustrated in FIG. 7B.

It is to be understood that the functionality discussed with regard to tag/tag reader 720 may be incorporated into an independent data reader system component and/or a cell phone, wireless PDA, personal media player, a necklace, or a belt attachment, or any other number of portable items. Docking station 705 contains connections to an electrical outlet for power and a communications terminal 740 for data connection to communications network 775, in the same connection point that the data reader 730 utilizes.

Figure 8A:
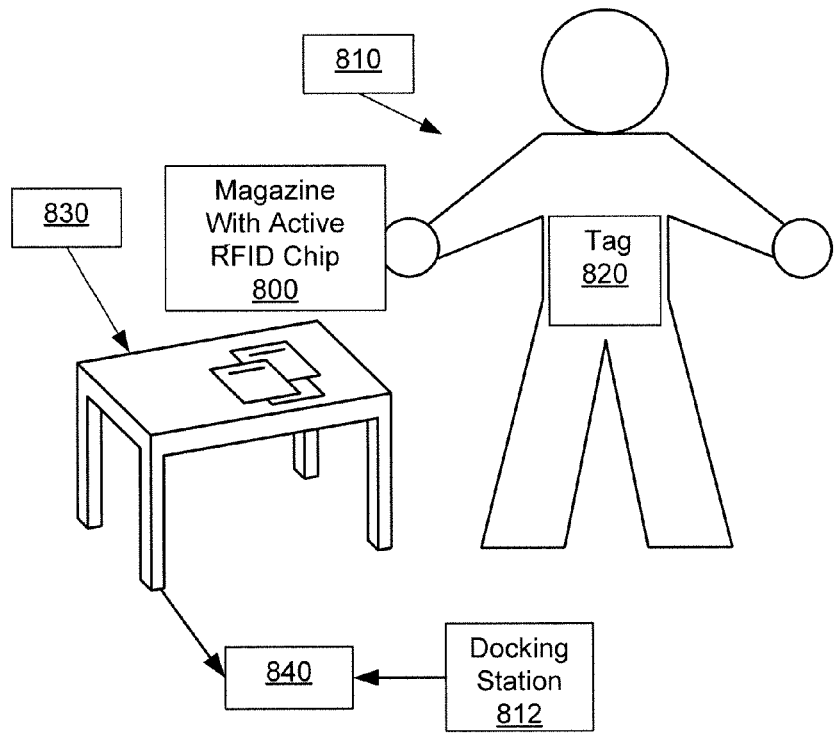
FIGS. 8A-8B illustrate aspects of a data acquisition process according to another alternate embodiment of the invention.

In another embodiment, as seen in FIG. 8A, a portable hardware component 820 that may be configured as a wearable/portable RFID component (alternately, it is to be understood that the functionality described with regard to tag 820, may be incorporated into a wireless PDA, a cell phone, a personal media player, or any other type of portable consumer electronic device). In some implementations it may be built into a portable wearable accoutrement such as a keychain, tie clip, necklace, bracelet, belt buckle or any other type of item that is carried or worn by the consumer. The portable hardware component may be configured with an active or passive RFID tag that holds a unique identifying code associated with the person 810 wearing or carrying the device 820. In this embodiment, RFID sensor card 800 is modified to include an active receiver circuit, which enables it to communicate with other tags.

In this embodiment, sensor card 800 has a range of several feet rather than mere inches, and so the receiver circuit can detect the presence of the person carrying or wearing RFID tag 820. The sensor card 800 would not only record the pages opened, through the marked media portion of a magazine, but also the identity (and/or demographic information) of the person opening the pages, when that person is wearing or carrying the portable hardware component with the RFID tag 820. Then, the magazine could be placed on the data reader (configured as a coffee table 830 in FIG. 8) and transmit all of the acquired data on both a person's exposure to magazine pages and the person's identity/demographic information via communication terminal 840 that facilitates data communication across communications network 875.

Figure 8B:
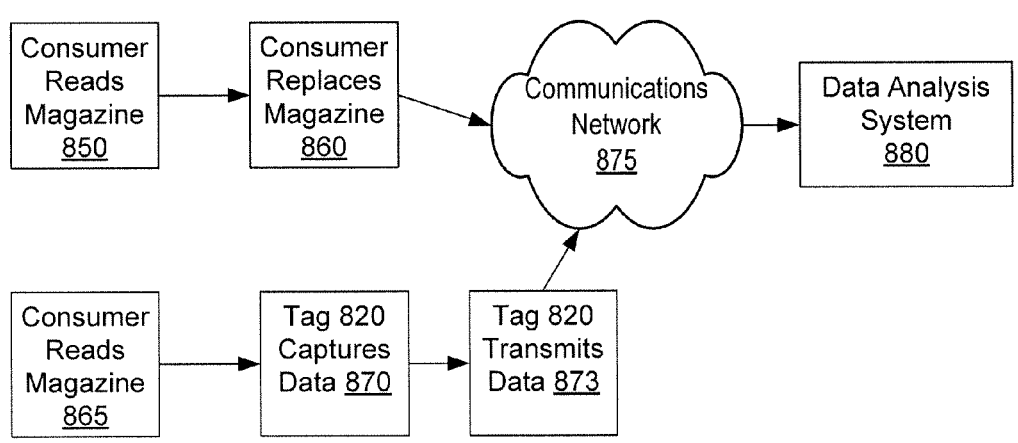

As illustrated in FIG. 8B, in an additional alternative embodiment, the data could be transmitted from sensor cards within the magazine to RFID tag 820 in steps 865 and 870. The consumer could then place RFID tag 820 in a docking station 812 that would recharge the battery in RFID tag 820 and transmit the data in RFID tag 820 to a data analysis system 880 in step 873 via communications network 875. Alternatively, the docking station 812 could contain a wireless modem through which the data could be transmitted over communications network 875 to the data analysis system 880.

The docking station 812 could transfer data extracted from RFID sensor cards 800 or alternately RFID tags (as illustrated in FIG. 5), respectively and transmit this data, preferably via communications network 875 to the data extraction system 880. The data reader may be configured with at least two indicator lights, one which illuminates when the element is properly connected to a power source and the other of which would indicate when it is time for the battery in the sensor card to be recharged. The data reader may also include a button that, when, pressed, transmits a unique identifying code to the data extraction system 880.

It is to be understood that the system provides significant flexibility and may be configured to meet the needs of a wide variety of users. As such, the aspects of the various media elements/media elements sleeves, data acquisition elements, data extraction elements, and data transmission elements may be used in a variety of combinations.

Possible Research Procedures

Practical implementations of printed media exposure data collection and analysis are next provided. These descriptions are intended to serve as possible applications of these print exposure measurement systems and do not encompass all of the ways in which this system could be implemented. The names and phone numbers of a predetermined sample of subscribers are reserved by the market researcher from the publisher for whom the survey is being conducted. A telephone field supplier retained by the survey coordinator would attempt to call the subscribers in this group and conduct a brief initial interview with them. The interview would consist of a question about whether the subscriber does indeed subscribe to the magazine, a question about the frequency with which she reads it, and a few demographic questions. If the subscriber confirms her subscription status and says that she reads the magazine, she will be asked to participate in the study in exchange for an incentive of cash or a non-cash gift or a charitable donation.

Throughout the field period in the public data acquisition embodiments of the system, the flow of data from the respondents who receive home networking devices may be monitored to assess their compliance with instructions that the magazines be stored in those racks. The field supplier will contact respondents with those devices from whom data has stopped flowing for a period of two days or more, except for respondents who have pressed the button on the rack indicating that they have finished with the magazine.

The names and phone numbers of a predetermined sample of subscribers are reserved by the market researcher from the publisher for whom the survey is being conducted. A telephone field supplier retained by the survey coordinator would attempt to call the subscribers in this group and conduct a brief initial interview with them. The interview would consist of a question about whether the subscriber does indeed subscribe to the magazine, a question about the frequency with which she reads it, and a few demographic questions. If the subscriber confirms her subscription status and says that she reads the magazine, she will be asked to participate in the study in exchange for an incentive of cash or a non-cash gift or a charitable donation.

After all the magazines or data logging sensor cards have been returned, in the case of the RFID sensor element from FIGS. 3A-3B, the system administrator 160 (from FIG. 1) may coordinate the download of the sensor data from the cards. In the case of the various sensor elements, the market researcher may process the data from the magazine rack networking units and, if applicable, the docking stations either on an ongoing, regular basis or after a plurality of respondents have pressed the button on the rack indicating that they have disposed of the magazine.

The market researcher may analyze the data to determine:
  a. the number of times the issue was opened,
  b. the total amount of time the issue had been open,
  c. the total time spent reading the pages with the conductive ink,
  d. the number of times the respondents or other readers were exposed to these pages,
  e. the times of day that the pages or issues were read,
  f. the amounts of time the issue was opened the first time it was opened, the second time it was opened, the third time it was opened, etc.,
  g. the amounts of time that respondents or other readers were exposed to the pages with conductive ink the first time that those pages were opened, the second time they were opened, etc.,
  h. the number of times the individual respondent opened the issue and/or the pages within the issue with conductive ink,
  i. The total amount of time the individual respondent opened the issue or was exposed to pages in the issue with conductive ink, j. the amount of time that the respondent spent with the issue or with individual page with conductive ink each time he or she opened it, k. the times of day that the respondent opened the issue or was exposed to pages in the issue with conductive ink, l. the number of days after the issue was sent to subscribers that the issue or page was read for the first time, for the second time, for the third time, etc., m. the number of days after the issue was sent to respondents that they themselves read the issue or a page with conductive ink for the first time, for the second time, for the third time, etc.

The market researcher will compile these data into a set of tables and/or a report for the publishing or advertising client. It is also possible that the data will be delivered through an interactive data analysis tool to which queries about the data set can be submitted. In addition, the data set and tables may be updated on a regular basis as new data from the subscribers to the magazine becomes available. For example, tables could be produced or extracted from the interactive data analysis tool one week after the issue is sent to subscribers, two weeks after it is sent, three weeks afterward, etc.

In another practical application of this invention, a set of magazines or catalogues, ranging from two to several hundred, would carry one of the types of RFID sensors or chip less tags described here and would be printed with conductive ink on one or more pages. RFID sensor elements could be applied to all of the copies of the magazine or just to copies sold through particular distribution channels, such as newsstands, home-based subscriptions, or business subscriptions. A large sample of people would be recruited to participate in the study for a longer period, ranging from one month to six months. This sample would not be restricted to subscribers to or readers of a particular magazine. The sample could be selected to represent the general population of the nation or a region or a state or a metropolitan area; or it could be selected to represent the users of a product or those who professed interest in a product or answered an advertisement for a product.

In the case of the RFID sensor element from FIGS. 3A-3B, the sample consumer could be asked to mail back every magazine they own (those they subscribe to, buy, or receive from other people) to the market researcher when they have finished reading them or to mail back the detachable sensor cards from all of their magazines when they have finished reading them, throughout the study period. In the case of the non-mailing embodiments, the sample exposure data could be extracted while the printed media is placed on the data reader when they are not being read.

If the data reader is portable, like the tag or tag reader worn or carried by a consumer, respondents could be asked to carry or wear the device at all times, or at least all of the times that they might read magazines. Throughout the one to six months in which the respondents are expected to participate, they would place their magazines on the data readers, and/or they would wear or carry the portable tag/tag reader and place the portable tag/tag reader into the docking stations to recharge the tag/tag reader and transmit the data. Participants would be paid an incentive whose amount would depend on the degree to which they cooperate with the study protocol.

The data from the returned sensor cards, data readers, or docking stations would be used by the market researcher to estimate the numbers of readers of each tagged magazine, each tagged issue of each magazine, and each tagged page of each magazine. In addition, these data would be used to estimate the amount of time that readers spend with each magazine and with each page marked with conductive ink, the number of times that readers of the magazines pick up each issue of each magazine, the number of times they look at each page of each issue that had been printed with conductive ink, and how long each issue takes to build its "audience" (i.e., the percentage of readers who first read it one week after it has been published, the percentage who first read it one or two weeks after it has been published, the percentage who read it within the first three weeks of publication, etc.)

Data Acquisition Hardware Components

In the first embodiment of this design (FIG. 3), interviewers will tell respondents that they will first be mailed a letter with a self-addressed stamped return envelope. Respondents will then be asked to read the magazine as they normally would, reading what they want to read as quickly or slowly as they want to read it, not treating it any differently than any other issue. When they have finished reading the magazine, they will use the enclosed envelope to mail the magazine or the detachable sensor card back to the field supplier. Finally, respondents will be told that they will receive the incentive on a particular day one to three months after the arrival of the issue in their homes regardless of how early they have mailed back the issue/sensor card. Of course, if they do not return the magazine or the sensor card bound into it, they will not be given their incentive.

In the some of the embodiments (FIGS. 4A-4C, 5A-5C, and 8), phone interviewers may tell respondents that they will be sent a magazine rack or other type of extraction/distribution element. Then, respondents will be instructed to plug in the rack and perhaps attach it to a phone outlet/communication port or electrical outlet. The interviewers will then ask the respondents to put their upcoming issue of the magazine in that rack whenever they are not reading or looking into it. The magazine should be placed in the rack at least every two days or the maximum amount of time before the battery needs to be charged. The respondent will be instructed to press a designated button on the rack when he or she has finished with the magazine and wants to throw it away. The respondent will be told that she will receive the incentive on a pre-specified day 1-3 months after the issue's release, regardless of when the button on the rack is pressed.

In the case of the portable tag/tag reader embodiment, the interviewer will tell respondents that they will be receiving a key chain or necklace or other portable accoutrement containing an RFID tag and a docking station for this key chain, necklace, electronic device or portable accoutrement. Respondents will be instructed to carry or wear the key chain or necklace, respectively, at all times. Respondents will also be instructed to put the portable accoutrement (e.g., key chain, necklace) in its docking station at least every two nights. In the variation of the passive tag reader described in FIG. 7, interviewers will inform respondents that they will be receiving two devices—1. a case that they will be asked to carry and 2. a docking station that they will be asked to plug into the wall and perhaps into a telephone outlet or communications network. They will then be asked to place the case, containing an RFID tag reader, on or near the docking station. In a variation of this implementation, the portable accoutrement may be configured with a coin cell battery that may provide a greater duration of power to the accoutrement (e.g., one-month before it would need to be replaced). In this type of implementation the docking station may be optional.

In some implementations of the embodiments, the amounts of respondents' incentives for cooperation could be based on the number of days that they transmit usable data. They could, for example, be given more than one cash incentive or more than one gift, depending on the length of time that they cooperate with the study's protocol. The studies described above could also be accomplished by recruiting subscribers via the mail, the Internet, face-to-face interviews, or any of the various ways in which respondents are recruited for market research studies.

In all embodiments, the field supplier will forward the lists of cooperating subscribers to the market researcher, who will forward them to the publisher. About three days before the issue is to be mailed to subscribers, the field supplier will mail either the return envelopes or the magazine racks to the participants. When the magazine is printed, the publisher could add conductive ink to the designated pages of the copies to be sent to subscribers participating in the study. The publisher could also insert the required sensor cards, circuits, batteries, and other hardware shown in FIGS. 3-5 in these subscribers' copies.

Flexible Media Exposure Data Acquisition and Analysis Controller

Figure 9:
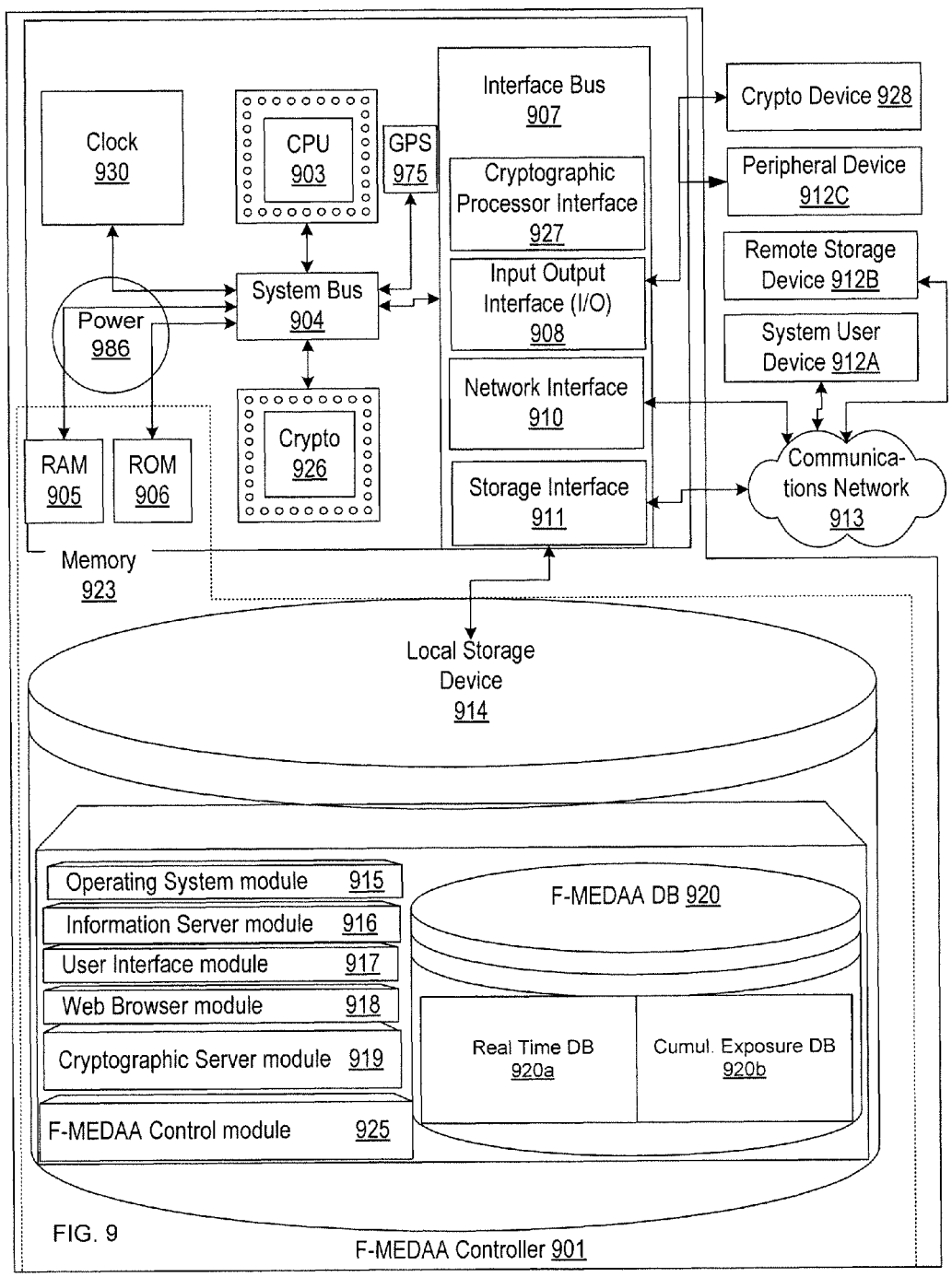
FIG. 9 illustrates computer systemization components associated with a F-MEDAA controller according to an embodiment of the invention.

FIG. 9 of the present disclosure illustrates inventive aspects of a Flexible Media Exposure Data Acquisition and Analysis ("F-MEDAA") controller 901 in a block diagram. In this embodiment, the F-MEDAA controller 901 may serve to process, store, search, serve, identify, instruct, generate, match, and/or update exposure data, and/or other related data.

Typically, users, which may be people and/or other systems, engage information technology systems (e.g., commonly computers) to facilitate information processing. In turn, computers employ processors to process information; such processors are often referred to as central processing units (CPU). A common form of processor is referred to as a microprocessor. A computer operating system, which, typically, is software executed by CPU on a computer, enables and facilitates users to access and operate computer information technology and resources. Common resources employed in information technology systems include: input and output mechanisms through which data may pass into and out of a computer; memory storage into which data may be saved; and processors by which information may be processed. Often information technology systems are used to collect data for later retrieval, analysis, and manipulation, commonly, which is facilitated through database software. Information technology systems provide interfaces that allow users to access and operate various system components.

In one embodiment, the F-MEDAA controller 901 may be connected to and/or communicate with entities such as, but not limited to: one or more users from user input devices 912A; peripheral devices 912C; a cryptographic processor device 928; and/or a communications network 913.

Networks are commonly thought to comprise the interconnection and interoperation of clients, servers, and intermediary nodes in a graph topology. It should be noted that the term "server" as used throughout this disclosure refers generally to a computer, other device, software, or combination thereof that processes and responds to the requests of remote users across a communications network. Servers serve their information to requesting "clients." The term "client" as used herein refers generally to a computer, other device, software, or combination thereof that is capable of processing and making requests and obtaining and processing any responses from servers across a communications network. A computer, other device, software, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The F-MEDAA controller 901 may be based on common computer systems that may comprise, but are not limited to, components such as: a computer systemization connected to memory 923.

Computer Systemization

A computer systemization may comprise a clock 930, central processing unit (CPU) 903, a read only memory (ROM) 906, a random access memory (RAM) 905, and/or an interface bus 907, and most frequently, although not necessarily, are all interconnected and/or communicating through a system bus 904. Optionally, the computer systemization may be connected to an internal power source 986. Optionally, a cryptographic processor 926 may be connected to the system bus. The system clock typically has a crystal oscillator and provides a base signal. The clock is typically coupled to the system bus and various clock multipliers that will increase or decrease the base operating frequency for other components interconnected in the computer systemization. The clock and various components in a computer systemization drive signals embodying information throughout the system. Such transmission and reception of signals embodying information throughout a computer systemization may be commonly referred to as communications.

These communicative signals may further be transmitted, received, and cause the of return and/or reply signal communications beyond the instant computer systemization to: communications networks, input devices, other computer systemizations, peripheral devices, and/or the like. Of course, any of the above components may be connected directly to one another, connected to the CPU, and/or organized in numerous variations employed as exemplified by various computer systems.

The CPU comprises at least one high-speed data processor adequate to execute program modules for executing user and/or system-generated requests. The CPU may be a microprocessor such as AMD's Gode, Athlon, Duron and/or Opteron; IBM and/or Motorola's PowerPC; Intel's Celeron, Itanium, Pentium, Xeon, and/or XScale; and/or the like processor(s). The CPU interacts with memory through signal passing through conductive conduits to execute stored program code according to conventional data processing techniques. Such signal passing facilitates communication within the F-MEDAA controller and beyond through various interfaces. Should processing requirements dictate a greater amount speed, parallel, mainframe and/or super-computer architectures may similarly be employed. Alternatively, should deployment requirements dictate greater portability, smaller Personal Digital Assistants (PDAs) may be employed.

Power Source

The power source 986 may be of any standard form for powering small electronic circuit board devices such as the following power cells: alkaline, lithium hydride, lithium ion, nickel cadmium, solar cells, and/or the like. Other types of AC or DC power sources may be used as well. In the case of solar cells, in one embodiment, the case provides an aperture through which the solar cell may capture photonic energy. The power cell 986 is connected to at least one of the interconnected subsequent components of the F-MEDAA thereby providing an electric current to all subsequent components. In one example, the power source 986 is connected to the system bus component 904. In an alternative embodiment, an outside power source 986 is provided through a connection across the I/O 908 interface. For example, a USB and/or IEEE 1394 connection carries both data and power across the connection and is therefore a suitable source of power.

Interface Adapters

Interface bus(ses) 907 may accept, connect, and/or communicate to a number of interface adapters, conventionally although not necessarily in the form of adapter cards, such as but not limited to: input output interfaces (I/O) 908, storage interfaces 911, network interfaces 910, and/or the like. Optionally, cryptographic processor interfaces 927 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 911 may accept, communicate, and/or connect to a number of storage devices such as, but not limited to: storage devices 914, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 910 may accept, communicate, and/or connect to a communications network 913. Through a communications network 913, the F-MEDAA controller is accessible through remote clients (e.g., computers with web browsers) by users. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 910 may be used to engage with various communications network types 913. For example, multiple network interfaces may be employed to allow for the communication over broadcast, multicast, and/or uni-cast networks.

Input Output interfaces (I/O) 908 may accept, communicate, and/or connect to user input devices 912A, peripheral devices 912C, cryptographic processor devices 928, and/or the like. I/O may employ connection protocols such as, but not limited to: Apple Desktop Bus (ADB); Apple Desktop Connector (ADC); audio: analog, digital, monaural, RCA, stereo, and/or the like; IEEE 1394a-b; infrared; joystick; keyboard; midi; optical; PC AT; PS/2; parallel; radio; serial; USB; video interface: BNC, coaxial, composite, digital, Digital Visual Interface (DVI), RCA, RF antennae, S-Video, VGA, and/or the like; wireless; and/or the like. A common output device 912C is a television set, which accepts signals from a video interface. Also, a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Typically, the video interface provides the composited video information through a video connection interface that accepts a video display interface (e.g., an RCA composite video connector accepting an RCA composite video cable; a DVI connector accepting a DVI display cable, etc.).

User input devices 912A may be card readers, dongles, finger print readers, gloves, graphics tablets, joysticks, keyboards, mouse (mice), remote controls, retina readers, trackballs, trackpads, and/or the like.

Peripheral devices 912C may be connected and/or communicate to I/O and/or other facilities of the like such as network interfaces, storage interfaces, and/or the like. Peripheral devices may be audio devices, cameras, dongles (e.g., for copy protection, ensuring secure transactions with a digital signature, and/or the like), external processors (for added functionality), goggles, microphones, monitors, network interfaces, printers, scanners, storage devices, video devices, video sources, visors, and/or the like.

It should be noted that although user input devices and peripheral devices may be employed, the F-MEDAA controller may be embodied as an embedded, dedicated, and/or monitor-less (i.e., headless) device, wherein access would be provided over a network interface connection.

Cryptographic units such as, but not limited to, microcontrollers, processors 926, interfaces 927, and/or devices 928 may be attached, and/or communicate with the F-MEDAA controller. A MC68HC16 microcontroller, commonly manufactured by Motorola Inc., may be used for and/or within cryptographic units. Equivalent microcontrollers and/or processors may also be used. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of CPU. Other commercially available specialized cryptographic processors include VLSI Technology's 33 MHz 6868 or Semaphore Communications' 40 MHz Roadrunner 184.

Memory

Generally, any mechanization and/or embodiment allowing a processor to affect the storage and/or retrieval of information is regarded as memory 923. However, memory is a fungible technology and resource, thus, any number of memory embodiments may be employed in lieu of or in concert with one another. It is to be understood that the F-MEDAA controller and/or a computer systemization may employ various forms of memory 923. For example, a computer systemization may be configured wherein the functionality of on-chip CPU memory (e.g., registers), RAM, ROM, and any other storage devices are provided by a paper punch tape or paper punch card mechanism; of course such an embodiment would result in an extremely slow rate of operation. In a typical configuration, memory 923 will include ROM 906, RAM 905, and a storage device 914. A storage device 914 may be any conventional computer system storage. Storage devices may include a drum; a (fixed and/or removable) magnetic disk drive; a magneto-optical drive; an optical drive (i.e., CD ROM/RAM/Recordable (CD-R), ReWritable (RW), DVD R/RW, etc.); and/or other devices of the like. Thus, a computer systemization generally requires and makes use of memory.

Module Collection

The memory 923 may contain a collection of program and/or database modules and/or data such as, but not limited to: operating system module(s) 915 (operating system); information server module(s) 916 (information server); user interface module(s) 917 (user interface); Web browser module(s) 918 (Web browser); F-MEDAA database(s) 920; cryptographic server module(s) 919 (cryptographic server); the F-MEDAA control module(s) 925; and/or the like (i.e., collectively a module collection). These modules may be stored and accessed from the storage devices and/or from storage devices accessible through an interface bus. Although non-conventional software modules such as those in the module collection, typically, are stored in a local storage device 914, they may also be loaded and/or stored in memory such as: peripheral devices, RAM, remote storage facilities through a communications network, ROM, various forms of memory, and/or the like.

Operating System

The operating system module 915 is executable program code facilitating the operation of the F-MEDAA controller. Typically, the operating system facilitates access of I/O, network interfaces, peripheral devices, storage devices, and/or the like. The operating system may be a highly fault tolerant, scalable, and secure system such as Apple Macintosh OS X (Server), AT&T Plan 9, Be OS, Linux, Unix, and/or the like operating systems. However, more limited and/or less secure operating systems also may be employed such as Apple Macintosh OS, Microsoft DOS, Palm OS, Windows 2000/2003/3.1/95/98/CE/Millenium/NT/XP (Server), and/or the like. An operating system may communicate to and/or with other modules in a module collection, including itself, and/or the like. Most frequently, the operating system communicates with other program modules, user interfaces, and/or the like. For example, the operating system may contain, communicate, generate, obtain, and/or provide program module, system, user, and/or data communications, requests, and/or responses. The operating system, once executed by the CPU, may enable the interaction with communications networks, data, I/O, peripheral devices, program modules, memory, user input devices, and/or the like. The operating system may provide communications protocols that allow the F-MEDAA controller to communicate with other entities through a communications network 913. Various communication protocols may be used by the F-MEDAA controller as a subcarrier transport mechanism for interaction, such as, but not limited to: multicast, TCP/IP, UDP, unicast, and/or the like.

Information Server

An information server module 916 is stored program code that is executed by the CPU. The information server may be a conventional Internet information server such as, but not limited to Apache Software Foundation's Apache, and/or the Microsoft's Internet Information Server. The information server may allow for the execution of program modules through facilities such as Active Server Page (ASP), ActiveX, (ANSI) (Objective-) C (++), C#, Common Gateway Interface (CGI) scripts, Java, JavaScript, Practical Extraction Report Language (PERL), Python, WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), and/or the like. The information server provides results in the form of Web pages to Web browsers, and allows for the manipulated generation of the Web pages through interaction with other program modules. After a Domain Name System (DNS) resolution portion of an HTTP request is resolved to a particular information server, the information server resolves requests for information at specified locations on the F-MEDAA controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other modules in a module collection, including itself, and/or facilities of the like. Most frequently, the information server communicates with the F-MEDAA database 920 operating systems, other program modules, user interfaces, Web browsers, and/or the like.

Access to the F-MEDAA database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the F-MEDAA controller. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the F-MEDAA controller as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program module, system, user, and/or data communications, requests, and/or responses.

User Interface

The function of computer interfaces in some respects is similar to automobile operation interfaces. Automobile operation interface elements such as steering wheels, gearshifts, and speedometers facilitate the access, operation, and display of automobile resources, functionality, and status. Computer interaction interface elements such as check boxes, cursors, menus, scrollers, and windows (collectively and commonly referred to as widgets) similarly facilitate the access, operation, and display of data and computer hardware and operating system resources, functionality, and status. Operation interfaces are commonly called user interfaces. Graphical user interfaces (GUIs) such as the Apple Macintosh Operating System's Aqua, Microsoft's Windows XP, or Unix's X-Windows provide a baseline and means of accessing and displaying information graphically to users.

A user interface module 917 is stored program code that is executed by the CPU. The user interface may be a conventional graphic user interface as provided by, with, and/or atop operating systems and/or operating environments such as Apple Macintosh OS, e.g., Aqua, Microsoft Windows (NT/XP), Unix X Windows (KDE, Gnome, and/or the like), mythTV, and/or the like. The user interface may allow for the display, execution, interaction, manipulation, and/or operation of program modules and/or system facilities through textual and/or graphical facilities. The user interface provides a facility through which users may affect, interact, and/or operate a computer system. A user interface may communicate to and/or with other modules in a module collection, including itself, and/or facilities of the like. Most frequently, the user interface communicates with operating systems, other program modules, and/or the like. The user interface may contain, communicate, generate, obtain, and/or provide program module, system, user, and/or data communications, requests, and/or responses.

Web Browser

A Web browser module 918 is stored program code that is executed by the CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Some Web browsers allow for the execution of program modules through facilities such as Java, JavaScript, ActiveX, and/or the like. Web browsers and like information access tools may be integrated into PDAs, cellular telephones, and/or other mobile devices. A Web browser may communicate to and/or with other modules in a module collection, including itself, and/or facilities of the like. Most frequently, the Web browser communicates with information servers, operating systems, integrated program modules (e.g., plug-ins), and/or the like; e.g., it may contain, communicate, generate, obtain, and/or provide program module, system, user, and/or data communications, requests, and/or responses. Of course, in place of a Web browser and information server, a combined application may be developed to perform similar functions of both. The combined application would similarly affect the obtaining and the provision of information to users, user agents, and/or the like from the F-MEDAA enabled nodes. The combined application may be nugatory on systems employing standard Web browsers.

Cryptographic Server

A cryptographic server module 919 is stored program code that is executed by the CPU 903, cryptographic processor 926, cryptographic processor interface 927, cryptographic processor device 928, and/or the like. Cryptographic processor interfaces will allow for expedition of encryption and/or decryption requests by the cryptographic module; however, the cryptographic module, alternatively, may run on a conventional CPU. The cryptographic module allows for the encryption and/or decryption of provided data. The cryptographic module allows for both symmetric and asymmetric (e.g., Pretty Good Protection (PGP)) encryption and/or decryption. The cryptographic module may employ cryptographic techniques such as, but not limited to: digital certificates (e.g., X.509 authentication framework), digital signatures, dual signatures, enveloping, password access protection, public key management, and/or the like. The cryptographic module will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash function), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the F-MEDAA may encrypt all incoming and/or outgoing communications and may serve as node within a virtual private network (VPN) with a wider communications network. The cryptographic module facilitates the process of "security authorization" whereby access to a resource is inhibited by a security protocol wherein the cryptographic module effects authorized access to the secured resource. In addition, the cryptographic module may provide unique identifiers of content, e.g., employing an MD5 hash to obtain a unique signature for a digital audio file. A cryptographic module may communicate to and/or with other modules in a module collection, including itself, and/or facilities of the like. The cryptographic module supports encryption schemes allowing for the secure transmission of information across a communications network to enable the F-MEDAA module to engage in secure transactions if so desired. The cryptographic module facilitates the secure accessing of resources on the F-MEDAA controller and facilitates the access of secured resources on remote systems; i.e., it may act as a client and/or server of secured resources. Most frequently, the cryptographic module communicates with information servers, operating systems, other program modules, and/or the like. The cryptographic module may contain, communicate, generate, obtain, and/or provide program module, system, user, and/or data communications, requests, and/or responses.

The F-MEDAA Database

The F-MEDAA database module 920 may be embodied in a database and its stored data. The database is stored program code, which is executed by the CPU, the stored program code portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the F-MEDAA database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of functionality encapsulated within a given object. If the F-MEDAA database is implemented as a data-structure, the use of the F-MEDAA database 920 may be integrated into another module such as the F-MEDAA module 925. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the F-MEDAA database module 920 includes several tables 920*a-b*. Data table 920*a* includes fields and data related to real-time exposure data acquisition. Data table 920*b* includes data extracted from the cumulative exposure data acquisition. These database elements may include additional tables storing raw exposure data or analyzed (processed raw exposure) data. In one embodiment, the F-MEDAA database may interact with other database systems.

In one embodiment, user programs may contain various user interface primitives, which may serve to update the F-MEDAA system. Also, various accounts may require custom database tables depending upon the environments and the types of clients the F-MEDAA system may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database modules 920*a-d*. The F-MEDAA controller may be configured to keep track of various settings, inputs, and parameters via database controllers.

The F-MEDAA database may communicate to and/or with other modules in a module collection, including itself, and/or facilities of the like. Most frequently, the F-MEDAA database communicates with the F-MEDAA control module 925, other program modules, and/or the like. The database may contain, retain, and provide information regarding other nodes and data.

The F-MEDAA System

The F-MEDAA control module 925 is stored program code that is executed by the CPU. The F-MEDAA control module affects accessing, obtaining and the provision of information, services, transactions, and/or the like across various communications networks, as well as creating and facilitating the F-MEDAA modules as discussed above.

The F-MEDAA module enables access of information between nodes and may be developed by employing standard development tools such as, but not limited to: (ANSI) (Objective-) C (++), Apache modules, binary executables, database adapters, Java, JavaScript, mapping tools, procedural and object oriented development tools, PERL, Python, shell scripts, SQL commands, web application server extensions, WebObjects, and/or the like. In one embodiment, the F-MEDAA server employs a cryptographic server to encrypt and decrypt communications. The F-MEDAA module may communicate to and/or with other modules in a module collection, including itself, and/or facilities of the like. Most frequently, the F-MEDAA module communicates with the F-MEDAA database, operating systems, other program modules, and/or the like. The F-MEDAA system may contain, communicate, generate, obtain, and/or provide program module, system, user, and/or data communications, requests, and/or responses.

Distributed F-MEDAA

The structure and/or operation of any of the F-MEDAA controller components may be combined, consolidated, and/or distributed in any number of ways to facilitate development and/or deployment. Similarly, the module collection may be combined in any number of ways to facilitate deployment and/or development. To accomplish this, one may integrate the components into a common code base or in a facility that can dynamically load the components on demand in an integrated fashion.

The module collection may be consolidated and/or distributed in countless variations through standard data processing and/or development techniques. Multiple instances of any one of the program modules in the program module collection may be instantiated on a single node, and/or across numerous nodes to improve performance through load-balancing and/or data-processing techniques. Furthermore, single instances may also be distributed across multiple controllers and/or storage devices; e.g., databases. All program module instances and controllers working in concert may do so through standard data processing communication techniques.

The configuration of the F-MEDAA controller will depend on the context of system deployment. Factors such as, but not limited to, the budget, capacity, location, and/or use of the underlying hardware resources may affect deployment requirements and configuration. Regardless of whether the configuration results in more consolidated and/or integrated program modules, results in a more distributed series of program modules, and/or results in some combination between a consolidated and distributed configuration, data may be communicated, obtained, and/or provided. Instances of modules consolidated into a common code base from the program module collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If module collection components are discrete, separate, and/or external to one another, then communicating, obtaining, and/or providing data with and/or to other module components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), process pipes, shared files, and/or the like. Messages sent between discrete module components for inter-application communication or within memory spaces of a singular module for intra-application communication may be facilitated through the creation and parsing of a grammar. A grammar may be developed by using standard development tools such as lex, yacc, XML, and/or the like, which allow for grammar generation and parsing functionality, which in turn may form the basis of communication messages within and between modules. Again, the configuration will depend upon the context of system deployment.

The entirety of this disclosure (including the Cover Page, Title, Headings, Field, Background, Summary, Brief Description of the Drawings, Detailed Description, Claims, Abstract, Figures, and otherwise) shows by way of illustration various embodiments in which the claimed inventions may be practiced. The advantages and features of the disclosure are of a representative sample of embodiments only, and are not exhaustive and/or exclusive. They are presented only to assist in understanding and teach the claimed principles. It should be understood that they are not representative of all claimed inventions. As such, certain aspects of the disclosure have not been discussed herein. That alternate embodiments may not have been presented for a specific portion of the invention or that further undescribed alternate embodiments may be available for a portion is not to be considered a disclaimer of those alternate embodiments. It will be appreciated that many of those undescribed embodiments incorporate the same principles of the invention and others are equivalent. Thus, it is to be understood that other embodiments may be utilized and functional, logical, organizational, structural, operational and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program modules (a module collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the invention, and inapplicable to others. In addition, the disclosure includes other inventions not presently claimed. Applicant reserves all rights in those presently unclaimed inventions including the right to claim such inventions, file additional applications, continuations, continuations in part, divisions, and/or the like thereof. As such, it should be understood that advantages, embodiments, examples, functional, features, logical, organizational, structural, topological, and/or other aspects of the disclosure are not to be considered limitations on the disclosure as defined by the claims or limitations on equivalents to the claims.

We claim:

1. A data acquisition method, comprising:
   incorporating a marker region and a sensor element with a media element, wherein the media element includes a printed publication and a separable printed publication sleeve accessory into which the printed publication is separably insertable and wherein the marker region comprises conductive material having time-variable conductive properties that change permanently in correlation with an exposure duration associated with the at least one media exposure event;
   detecting an action event wherein an initial spatial relationship between the marker region and the sensor element is changed;
   updating the sensor element when an action event is detected; and
   resolving at least one sensor element update to correlate at least one action event with at least one media exposure event for the media element.

2. The data acquisition method of claim 1, wherein the printed publication is configured with the marker region and the sensor element.

3. The data acquisition method of claim 2, wherein the initial spatial relationship associated with the marker region and the sensor element is established when the printed publication is closed.

4. The method of claim 3, wherein changing the initial spatial relationship involves opening the printed publication.

5. The method of claim 3, wherein changing the initial spatial relationship involves displacing the marker region formed on a page of the printed publication with regard to a position associated with the sensor element.

6. A data acquisition method, comprising:
   incorporating a marker region and a sensor element with a media element, wherein the media element includes a printed publication and a separable printed publication sleeve accessory into which the printed publication is separably insertable and wherein the separable printed publication sleeve accessory is configured with the marker region and the sensor element;
   detecting an action event wherein an initial spatial relationship between the marker region and the sensor element is changed;
   updating the sensor element when an action event is detected; and
   resolving at least one sensor element update to correlate at least one action event with at least one media exposure event for the media element.

7. The data acquisition method of claim 6, wherein the initial spatial relationship associated with the marker region and the sensor element is established when the separable printed publication sleeve accessory is closed.

8. The method of claim 7, wherein changing the initial spatial relationship involves opening the separable printed publication sleeve accessory.

9. The method of claim 8, wherein changing the initial spatial relationship involves displacing the marker region formed on a page of the printed publication with regard to a position associated with the sensor element formed in the separable printed publication sleeve accessory.

10. The method of claim 8, wherein changing the initial spatial relationship involves displacing the marker region formed on the separable printed publication sleeve accessory with regard to a position associated with the sensor element formed in the separable printed publication sleeve accessory.

11. The method of claim 6, wherein no marker region or sensor element is incorporated in any cover of the printed publication.

12. A data acquisition method, comprising:
   incorporating a marker region and a sensor element with a media element, wherein the media element includes a printed publication and a separable printed publication sleeve accessory into which the printed publication is separably insertable and wherein both the printed publication and the separable printed publication sleeve accessory are configured with at least one marker region and sensor element;
   detecting an action event wherein an initial spatial relationship between the marker region and the sensor element is changed;
   updating the sensor element when an action event is detected; and
   resolving at least one sensor element update to correlate at least one action event with at least one media exposure event for the media element.

13. The data acquisition method of claim 12, wherein an initial spatial relationship associated with a marker region and a sensor element is established when the separable printed publication sleeve accessory is closed.

14. The method of claim 13, wherein changing the initial spatial relationship involves opening the separable printed publication sleeve accessory.

15. The method of claim 13, wherein changing the initial spatial relationship involves displacing the marker region formed on a page of the printed publication with regard to a position associated with the sensor element situated in the separable printed publication sleeve accessory.

16. The method of claim 13, wherein changing the initial spatial relationship involves displacing the marker region formed on the separable printed publication sleeve accessory with regard to a position associated with the sensor element situated in the separable printed publication sleeve accessory.

17. A data acquisition method, comprising:
incorporating at least one marker region and at least one sensor element with a printed media element, wherein the at least one sensor element is incorporated into a reusable printed publication sleeve accessory into which a printed publication is separably insertable; and
configuring the at least one marker region with electrically conductive material and wherein the at least one marker region and the at least one sensor element are electromagnetically coupled.

18. A media exposure data acquisition system comprising:
a media element;
a separable media element sleeve accessory configured to be separably secured to the media element;
one or more marker regions configured to communicate with one or more sensor elements the occurrence of a media exposure event, wherein the separable media element sleeve accessory is configured with the one or more marker regions and the one or more sensor elements; and
a data reader configured to extract media exposure event data from the one or more sensor elements.

19. The media exposure data acquisition system of claim 18, wherein the media element is configured with one or more marker regions and one or more sensor elements.

20. The media exposure data acquisition system of claim 18, wherein the sensor elements incorporate an electromagnetic sensor component.

21. The media exposure data acquisition system of claim 18, wherein the sensor elements incorporate a magnetic sensor component.

22. A media exposure data acquisition system comprising:
a media element;
a separable media element sleeve accessory configured to be separably secured to the media element;
one or more marker regions configured to communicate with one or more sensor elements the occurrence of a media exposure event;
a media match determination component, wherein the media match determination component includes a match sensor element configured to determine whether the separable media element sleeve accessory is secured with a correlated media element; and
a data reader configured to extract media exposure event data from the one or more sensor elements.

23. The media exposure data acquisition system of claim 22, wherein the media match determination component is configured to generate a media mis-match alert when the media match determination component determines the separable media element sleeve accessory is not secured with the correlated media element.

* * * * *